United States Patent
Ceylan et al.

(10) Patent No.: US 9,305,397 B2
(45) Date of Patent: Apr. 5, 2016

(54) VERTEX ORDER IN A TESSELLATION UNIT

(71) Applicant: QUALCOMM Incorporated, San Diego, CA (US)

(72) Inventors: Usame Ceylan, Orlando, FL (US); Vineet Goel, Winter Park, FL (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 13/659,675

(22) Filed: Oct. 24, 2012

(65) Prior Publication Data

US 2014/0111513 A1    Apr. 24, 2014

(51) Int. Cl.
*G06T 17/20* (2006.01)

(52) U.S. Cl.
CPC ........................ *G06T 17/20* (2013.01)

(58) Field of Classification Search
None
See application file for complete search history.

(56) References Cited

U.S. PATENT DOCUMENTS

| | | | |
|---|---|---|---|
| 4,930,092 A * | 5/1990 | Reilly | 345/423 |
| 6,906,716 B2 | 6/2005 | Moreton et al. | |
| 6,940,505 B1 | 9/2005 | Savine et al. | |
| 7,209,137 B2 | 4/2007 | Brokenshire et al. | |
| 8,169,437 B1 | 5/2012 | Legakis et al. | |
| 2010/0164955 A1 | 7/2010 | Sathe et al. | |
| 2011/0057931 A1* | 3/2011 | Goel et al. | 345/423 |
| 2011/0128285 A1* | 6/2011 | Gong | 345/423 |
| 2011/0310102 A1 | 12/2011 | Chang | |
| 2013/0162651 A1 | 6/2013 | Martin et al. | |

FOREIGN PATENT DOCUMENTS

GB    2488907 A    9/2012

OTHER PUBLICATIONS

International Search Report and Written Opinion—PCT/US2013/061448—ISA/EPO—Jul. 16, 2014, 12 pp.
International Preliminary Report on Patentability from International Application No. PCT/US2013/061448, dated Jan. 30, 2015, 8 pages.

\* cited by examiner

*Primary Examiner* — Daniel Hajnik
(74) *Attorney, Agent, or Firm* — Shumaker & Sieffert, P.A.

(57) ABSTRACT

Systems and methods for a tessellation are described. These systems and methods may divide the domain into a plurality of portions, including a first portion. The systems and methods may also determine coordinates for vertices for a first set of shapes that reside within the first portion, wherein each shape of the first set of shapes includes at least one vertex on a first edge of the first portion. After determining coordinates for the vertices for the first set of shapes, the systems and methods may determine coordinates for vertices for a second set of shapes that reside within the first portion. Each shape of the second set of shapes shares at least one vertex with at least one shape of the first set of shapes and none of the shapes of the second set of shapes includes a vertex on the first edge of the first portion.

41 Claims, 12 Drawing Sheets

VERTEX ORDER IN A TESSELLATION UNIT

TECHNICAL FIELD

This disclosure relates to techniques for video processing, and more specifically to video processing using tessellated primitives.

BACKGROUND

Computing devices are increasingly requiring advanced two-dimensional (2D) and three-dimensional (3D) graphics applications. For example, computing devices are increasingly offering games, character animations, graphical menu systems and other applications that require advanced graphics rendering. This advanced graphics rendering, especially with 3D graphics, involves a substantial amount of data processing. The quality of the advanced graphics rendering may be limited by the amount of processing resources, the capability of the available processing resources, the amount of available power and the like.

For example, applications requiring advanced graphics rendering at a high rendering rate, e.g., measured as frames per second, may place a significant strain on the available computing resources. The strain on the available computing resources may result in a reduced performance in other applications, low quality graphics rendering, or both due to the heavy load placed on the computing resources. In the context of mobile computing devices, such as personal digital assistants (PDAs), wireless communication devices, global positioning devices and the like, the computationally intensive data processing required for graphics rendering may consume a significant amount of the available power of the mobile computing device.

A multi-media processor may include a general-purpose central processing unit (CPU) coupled to a graphics processing unit (GPU). The GPU is dedicated to perform graphics rendering operations to display computerized graphics on a display. GPUs are built with a highly-parallel structure that provides more efficient processing than conventional, general-purpose CPUs for a range of complex graphic-related algorithms. When the graphic-related algorithms executing on the CPU requires graphics processing, the CPU tessellates the graphics and provides the tessellations to the GPU for rendering to the display. The highly parallel nature of the GPU allows the GPU to create complex, three-dimensional images on the display more quickly than drawing the images directly to the display with the CPU. GPUs may be used in a wide variety of applications, and are very common in graphic-intensive applications, such as video games applications, complex graphical user interface applications, computer-aided design programs for engineering or artistic applications, or any other type of software application that uses 2D or 3D graphics.

Modern GPU architectures may include a tessellation stage. The tessellation stage may be hardware within the GPU and may be configured to perform specific fixed functions. As one example, the tessellation stage of the GPU may tessellate Quad or Triangle domains into smaller triangles. The domain may be considered as a portion of the image, and may include four sides (quad domain) or three sides (triangle domain). Vertices are buffered in a vertex reuse buffer of limited size, and the connectivity information for triangles is outputted. Due to the limited size of the vertex reuse buffer, some vertices need to be recalculated as the connectivity information comes in. Some example approaches produce around 1 primitive per clock cycle. This is not necessarily the case for all implementations, however.

SUMMARY

In general, the techniques described in this disclosure are directed to determining coordinates for points along first and second portions of an edge of a ring within a domain used for tessellating. In an example, a point generator, for example, located in a tessellator, may process a domain by following a sequence or order by which the tessellation triangles are calculated for a given tessellation level. The ordering of the primitive output from the tessellation unit may affect the vertex reuse at the subsequent stage. Accordingly, the techniques may select orderings (sometimes referred to as walking) that allow for reuse of the vertexes within the vertex reuse buffer size limit. As described herein, walking may be performed such that calculated vertex information may be reused.

Various systems, methods, and devices described herein provide for a changed order of output primitives to efficiently utilize the vertex reuse buffer as to minimize the number of times coordinates of a vertex need to be calculated. This may decrease the number of domain shader invocations. The domain shader turns coordinates of a vertex into something tangible (such as, a point in 3-D space) for use downstream from the domain shader. Decreasing the number of domain shader invocations may save power and increase performance.

In one example, the disclosure described a tessellation unit for tessellating a domain, wherein the tessellation unit divides the domain into a plurality of portions, including a first portion. The tessellation unit determines coordinates for vertices for a first set of shapes that reside within the first portion, wherein each shape of the first set of shapes includes at least one vertex on a first edge of the first portion. After determining coordinates for the vertices for the first set of shapes, determine coordinates for vertices for a second set of shapes that reside within the first portion. Each shape of the second set of shapes shares at least one vertex with at least one shape of the first set of shapes. Additionally, none of the shapes of the second set of shapes includes a vertex on the first edge of the first portion.

In another example, the disclosure described a method of tessellating a domain including dividing the domain into a plurality of portions, including a first portion. The method also determines coordinates for vertices for a first set of shapes that reside within the first portion, wherein each shape of the first set of shapes includes at least one vertex on a first edge of the first portion. After determining coordinates for the vertices for the first set of shapes, determining coordinates for vertices for a second set of shapes that reside within the first portion. Each shape of the second set of shapes shares at least one vertex with at least one shape of the first set of shapes. Additionally, none of the shapes of the second set of shapes includes a vertex on the first edge of the first portion.

In another example, the disclosure described a tessellation unit for tessellating a domain, the tessellation unit including means for dividing the domain into a plurality of portions, including a first portion. The tessellation unit further includes means for determining coordinates for vertices for a first set of shapes that reside within the first portion, wherein each shape of the first set of shapes includes at least one vertex on a first edge of the first portion. After determining coordinates for the vertices for the first set of shapes, means for determining coordinates for vertices for a second set of shapes that reside within the first portion. Each shape of the second set of shapes shares at least one vertex with at least one shape of the first set of shapes. None of the shapes of the second set of shapes includes a vertex on the first edge of the first portion.

In another example, the disclosure described a non-transitory computer-readable medium comprising instructions that when executed in a sink device cause a programmable processor to tessellating a domain by performing the following steps. The processor divides the domain into a plurality of portions, including a first portion. The processor determines coordinates for vertices for a first set of shapes that reside within the first portion, wherein each shape of the first set of shapes includes at least one vertex on a first edge of the first portion. After determining coordinates for the vertices for the first set of shapes, determine coordinates for vertices for a second set of shapes that reside within the first portion. Each shape of the second set of shapes shares at least one vertex with at least one shape of the first set of shapes. None of the shapes of the second set of shapes includes a vertex on the first edge of the first portion.

In another example, the disclosure describes a device including a central processing unit (CPU) and a graphics processing unit (GPU). The GPU includes a tessellation unit for tessellating a domain. The tessellation unit is configured to divide the domain into a plurality of portions, including a first portion. The tessellation unit is also configured to determine coordinates for vertices for a first set of shapes that reside within the first portion, wherein each shape of the first set of shapes includes at least one vertex on a first edge of the first portion. After determining coordinates for the vertices for the first set of shapes, determine coordinates for vertices for a second set of shapes that reside within the first portion. Each shape of the second set of shapes shares at least one vertex with at least one shape of the first set of shapes. None of the shapes of the second set of shapes includes a vertex on the first edge of the first portion.

The details of one or more examples are set forth in the accompanying drawings and the description below. Other features, objects, and advantages will be apparent from the description and drawings, and from the claims.

DETAILED DESCRIPTION

Figure 1:
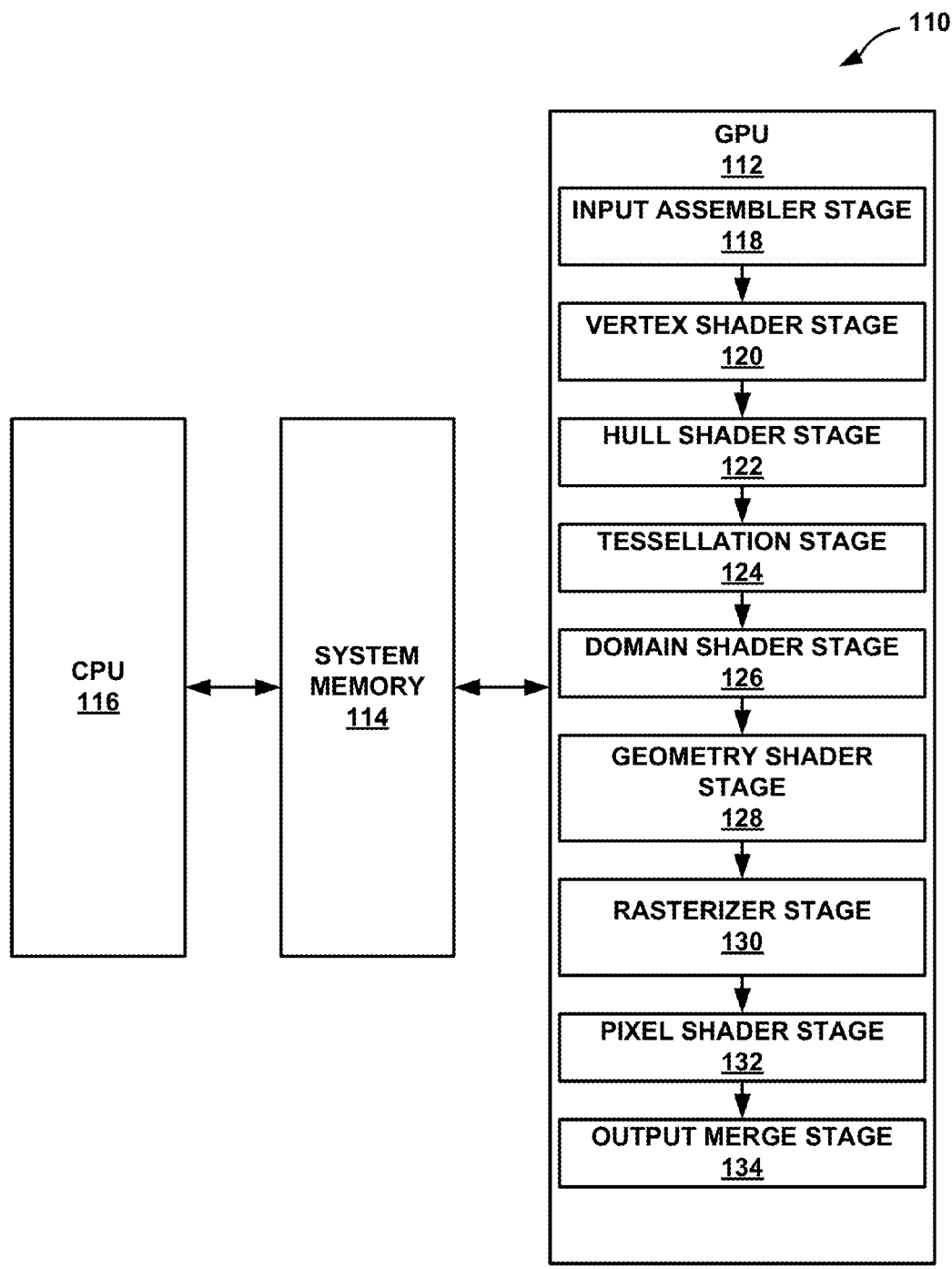
FIG. 1 is a block diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, may include a CPU (Central Processing Unit), a graphics processing unit (GPU) and system memory. When rendering graphics as part of executing an application, the CPU transmits instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® API developed by the Khronos Group, as two examples. For purposes of illustration and to ease with understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

The tessellation process refers to dividing a portion (referred to as domain) of a surface of an object into a plurality of smaller portions, and interconnecting the smaller portions together. This results in a more highly detailed surface, as compared to the surface prior to tessellation. Tessellation allows the application executing on the CPU to define the surface with low resolution, which may require few points, and allows the GPU to generate a higher resolution surface.

For example, the tessellation stage may be a hardware unit that divides a domain into a plurality of triangles. The domain shader may then take the vertices of the triangles in the domain and convert the vertices into a patch. This conversion of a surface into a plurality of primitives results in a more detailed surface. The GPU may receive information for a coarse surface, and generate a high resolution surface, rather than receiving information for the high resolution surface. Receiving information for the high resolution surface, rather than the coarse surface, may be bandwidth inefficient because the amount of information needed to define the high resolution surface may be much greater than the amount of information needed to define coarse resolution surface. As an example, the tessellation stage of the GPU may receive a domain. The tessellation stage of the GPU may divide the domain into smaller triangles, as one example. When the smaller triangles are connected together the resulting image portion may appear more detailed than the original image portion. In accordance with techniques described in this disclosure, the dividing of the domain into smaller triangles and the subsequent connection of the smaller triangles may be considered as tessellation.

With tessellation, computation efficiency may be realized because the application executing on the CPU may not need to generate the higher resolution surface, and may instead offload the generation the higher resolution surface to the GPU. Furthermore, bandwidth efficiency may also be realized because the CPU may need to transmit information for fewer points of the surface because the low resolution surface includes fewer points as compared to the higher resolution surface, and the GPU may need to retrieve fewer points of the surface.

As described above, the GPU applies the tessellation process to a patch. A patch may be considered as a specialized type of a primitive. A patch is defined by one or more control points that together form a portion of a surface. For example, an object, such as a sphere, may be divided into a plurality of surfaces. In this example, the surfaces may be curved surfaces that, when combined, form the sphere. Each one of the surfaces may be divided into one or more patches, where each of the patches is defined by one or more control points.

Generally, a tessellation unit, such as tessellation stage 124, may divide the domain into a plurality of portions, including a first portion. The tessellation unit may determine coordinates for vertices for a first set of shapes that reside within the first portion, wherein each shape of the first set of shapes includes at least one vertex on a first edge of the first portion. A point generator, for example, located in a tessellator, i.e. tessellation unit, may process a domain by "walking" "Walking" indicates a sequence or order by which the tessellation triangles are calculated for a given tessellation level. The ordering of the primitive output from the tessellation unit may affect the vertex reuse at the subsequent stage. Accordingly, orderings may be selected that allow for reuse of the vertexes within the vertex reuse buffer size limit As described herein, walking may be performed such that calculated vertex information may be reused to minimize executions of a domain shader.

Various systems, methods, and devices described herein provide for a changed order of output primitives to efficiently utilize the vertex reuse buffer as to minimize vertex misses. This may decrease the number of domain shader invocations. The domain shader takes vertices of triangles in the domain and converts the vertices into vertices of a patch for use downstream from the domain shader. Decreasing the number of domain shader invocations may save power and increase performance.

When determining an ordering of the primitives output from the tessellation unit, the following may be considered, for example, (1) the current tessellator speed, which may be one primitive per clock cycle may generally need to be preserved, (2) the algorithm should not be too complex, and (3) it may be preferable that changes are only made in the tessellator unit. It some examples no change may be made to the reuse logic. The reuse logic is a series of hardware comparators, e.g., exclusive-OR gates (XOR gates), that may be used to determine if vertex information needed is stored in the vertex reuse buffer.

Generally, reuse may be accomplished by dividing a domain into smaller and smaller portions or sub-portions until a number of triangles can be "walked" as one set without over flowing the vertex reuse buffer. For example, a portion or sub-portion may have a small enough number of triangles to allow the entire portion or sub-portion to be walked without overflowing the vertex reuse buffer. It will be understood that, although a triangle has three vertices, because of vertex sharing between triangles, the total number of vertices that need to be stored will generally not be three times the number of triangles in a portion or sub-portion. Additionally, it will also be understood that some vertices in a portion or sub-portion may be overwritten without requiring a subsequent domain shader invocation, e.g., when the vertex information for that vertex is no longer needed. In some examples, the techniques assume a vertex reuse buffer with thirty-two sets of storage locations, however the techniques described in this disclosure are not limited to vertex reuse buffers with thirty-two set of storage locations. Alternatively, a portion or sub-portion may be larger than, e.g., thirty-two sets of vertex information, but the path walked may be arranged such that one or more reuses may occur. For example, it may be possible to select a path to walk such that all needed reuses occur before an over write. In other cases, it may be advantageous to select a path that allows some over writes to occur while reusing at least a portion of the vertex data stored in the vertex reuse buffer.

The control points may be defined by coordinates (e.g., x and y coordinates for two-dimensional patches or x, y, and z coordinates for three-dimensional patches), and the control points may be considered as vertices of the patch. There may be any number of control points in a patch. For instance, in some examples, the number of control points in a patch may be between one control point up to thirty-two control points. The number of control points in a patch may be fixed or user defined.

Unlike other primitive types, the control points within the patches may be connected to one another in any way. In other words, there is no predefined way in which the control points of the patches are connected. For example, a standard triangle primitive includes three vertices, and the primitive is defined with a specific way in which the three vertices are connected with one another to form the triangle. The control points, on the other hand, may not need to be connected in any specific way to form a shape. Rather, as one example, some control points in a patch may be connected with one another to form a triangle, other control points in the same patch may be connected with one another to form a rectangle, and yet other control points in the same patch may be connected with one another to form an octagon. As another example, it may be possible that the control points are connected with another to form the same type of shapes as well (e.g., connected to only form a plurality of triangles).

The control points that define a patch of a surface may define a low resolution surface. With the tessellation process, additional detail is added to create a higher resolution surface. For example, referring back to the example of the sphere. If only the control points were used to form the sphere, the sphere would appear jaggy with stair step like points, rather than a smooth curved surface. After tessellation, additional points are added such that when these points are connected, the sphere appears as if it is a smooth sphere.

The tessellation process, in accordance with the both the DirectX API and the OpenGL 4.x API, includes two shaders and a fixed-function unit. A shader is a software application that executes on a programmable shader core of the GPU, and provides substantial functional flexibility. For example, a shader may be used to calculate rendering effects on graphics hardware with a high degree of flexibility. The fixed-function unit is a hardwired logic unit that performs fixed functions, and may not provide functional flexibility. However, it may be possible to implement the functions of the fixed-function unit using a programmable shader coder to provide additional functional flexibility. Solely for purposes of illustration, the functions described in this disclosure for the fixed-function unit are described with a fixed-function unit that provides limited functional flexibility.

In the DirectX API, a graphics processing pipeline that is configured to implement the tessellation process includes a hull-shader stage coupled to a tessellation stage, which is coupled to a domain-shader stage. The hull-shader stage and the domain-shader stage in the DirectX API may form the two shaders of the tessellation process, and the tessellation stage may form the fixed-function unit of the tessellation process. The other stages in the graphics processing pipeline are similar to those in DirectX APIs that do not implement the tessellation process.

In the OpenGL 4.x API, a graphics processing pipeline that is configured to implement the tessellation process includes a tessellation control shader coupled to a primitive generator, which is coupled to a tessellation evaluation shader. The tessellation control shader and the tessellation evaluation shader in OpenGL 4.x may form the two shaders of the tessellation process, and the primitive generator may form the fixed-function unit of the tessellation process. The other stages in the graphics processing pipeline may be similar to those in OpenGL APIs that do not implement the tessellation process.

FIG. 1 is a block diagram illustrating an example of a graphics processing unit (GPU) that may implement an example of a graphics processing pipeline in accordance with one or more examples described in this disclosure. FIG. 1 illustrates device 110 that includes graphics processing unit (GPU) 112, system memory 114, and central processing unit (CPU) 116. Examples of device 110 include, but are not limited to, mobile wireless telephones, video gaming consoles that include video displays, mobile video conferencing units, laptop computers, desktop computers, television set-top boxes, and the like.

CPU 116 may execute various types of applications. Examples of the applications include web browsers, e-mail applications, spreadsheets, video games, or other applications that generate viewable objects for display. Instructions for execution of the one or more applications may be stored within system memory 114. CPU 116 may transmit graphics data of the generated viewable objects to GPU 112 for further processing.

For example, GPU 112 may be specialized hardware that allows for massive parallel processing, which functions well for processing graphics data. In this way, CPU 116 offloads graphics processing that is better handled by GPU 112. CPU 116 may communicate with GPU 112 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
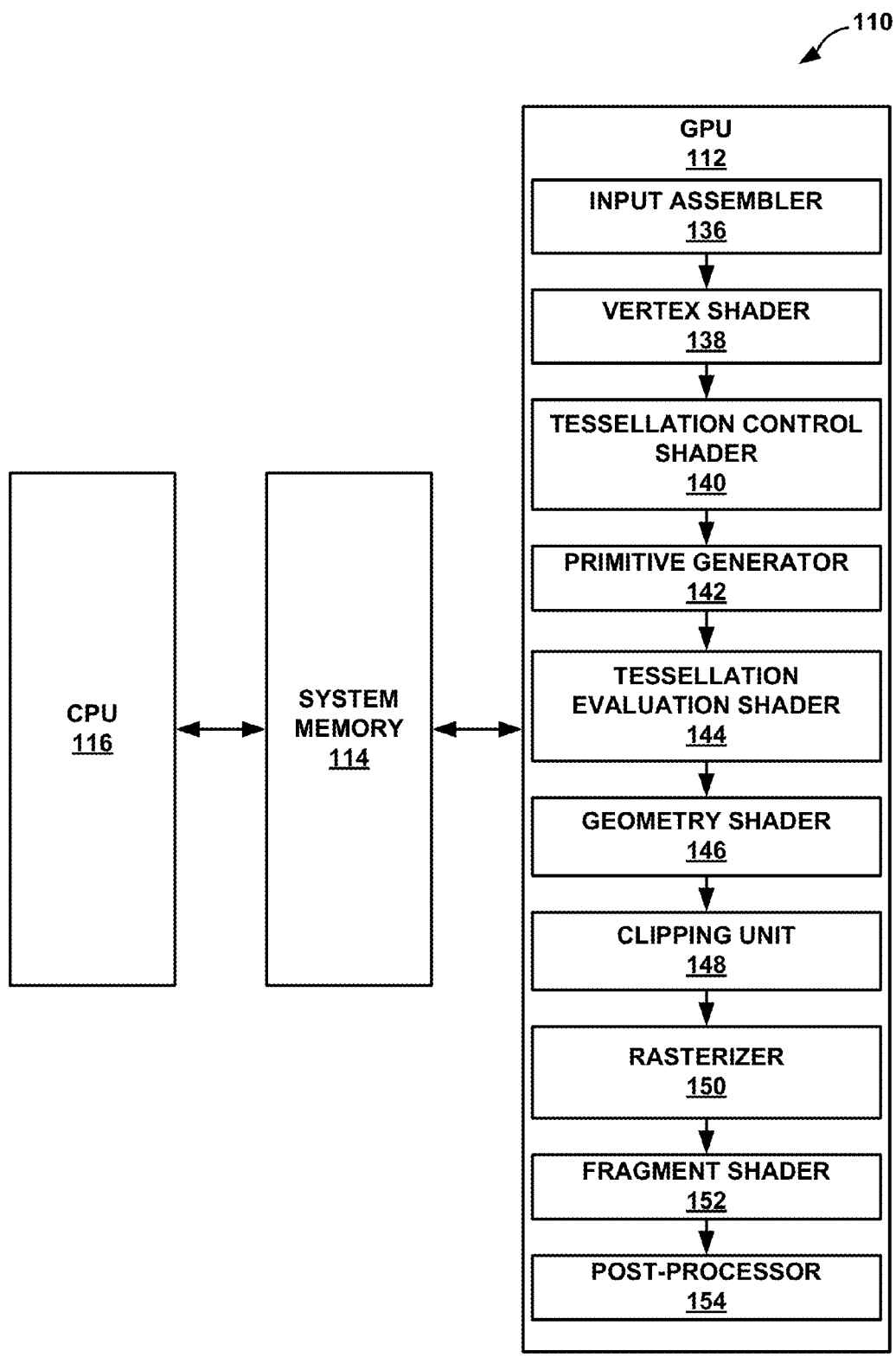
FIG. 2 is a block diagram illustrating another example of a GPU that may implement another example of a graphics processing pipeline in accordance with one or more examples described in this disclosure.

In addition to defining the manner in which GPU 112 is to receive graphics data from CPU 116, the APIs may define a particular graphics processing pipeline that GPU 112 is to implement. GPU 112, in FIG. 1, illustrates the graphics processing pipeline defined by the Direct3D 11 API. As described in more detail, FIG. 2 illustrates the graphics processing pipeline of the OpenGL 4.x API.

Examples of CPU 116 and GPU 112 include, but are not limited to, a digital signal processor (DSP), general purpose microprocessor, application specific integrated circuit (ASIC), field programmable logic array (FPGA), or other equivalent integrated or discrete logic circuitry. In some examples, GPU 112 may be specialized hardware that includes integrated and/or discrete logic circuitry that provides GPU 112 with massive parallel processing capabilities suitable for graphics processing. In some instances, GPU 112 may also include general purpose processing, and may be referred to as a general purpose GPU (GPGPU). The techniques described in this disclosure may also be applicable to examples where GPU 112 is a GPGPU.

System memory 114 may comprise one or more computer-readable storage media. Examples of system memory 114 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 114 may include instructions that cause CPU 116 and/or GPU 112 to perform the functions ascribed to CPU 116 and GPU 112 in this disclosure. Accordingly, system memory 114 may be a computer-readable storage medium comprising instructions that cause one or more processors, e.g., CPU 116 and GPU 112, to perform various functions.

System memory 114 may, in some examples, be considered as a non-transitory storage medium. The term "non-transitory" may indicate that the storage medium is not embodied in a carrier wave or a propagated signal. However, the term "non-transitory" should not be interpreted to mean that system memory 114 is non-movable. As one example, system memory 114 may be removed from device 110, and moved to another device. As another example, a system memory, substantially similar to system memory 114, may be inserted into device 110. In certain examples, a non-transitory storage medium may store data that can, over time, change (e.g., in RAM).

The execution of the applications on CPU 116 causes CPU 116 to generate a plurality of primitives that connect together to form the viewable content. Examples of the primitives include points, lines, triangles, squares, or any other type of polygon. CPU 116 may define these primitives by their respective vertices. For example, CPU 116 may define coordinates and color values for the vertices. The coordinate values may be three-dimensional (3D) coordinates or 2D coordinates.

In accordance with the techniques described in this disclosure, in some cases, CPU 116 may also generate a special type of primitive referred to as a patch. Similar to the other primitive types, a patch may be defined by a plurality of vertices, referred to as control points of a patch. Unlike other primitive types, the patch may not be any particular shape. For example, CPU 116 may interconnect the control points of the patch in any manner, so that the interconnected control points form any desired shape. For other primitive types such as triangles, CPU 116 may define the specific manner in which the vertices are interconnected (e.g., such that interconnection of the vertices results in a triangle).

Also, unlike other primitive types, the number of control points in a patch may be variable. For example, the application executing on CPU 116 may define a maximum number of control points that are allowed for a patch, or the maximum number of control points may be user-defined. In some examples, the number of control points in a patch may be one to thirty-two control points; however, the techniques described in this disclosure are not so limited.

CPU 116 may utilize the control patch for purposes of tessellation. As described above, a tessellation process refers to CPU 116 defining a portion of a surface of a viewable object in low resolution, and tessellating the portion to generate a higher resolution version of the surface. For example, CPU 116 may define control points of the patch such that when the control points are interconnected the patch forms a portion of a surface of a viewable object. If a surface were to be formed only from the control points of the patch, the surface may not appear with high resolution and may appear jaggy. With tessellation, additional primitives are added to the patch, such that when the primitives are interconnected they add detail to the patch, which increases the resolution of the patch and results in higher quality viewable content.

GPU 112 may be configured to implement tessellation. In this way, CPU 116 may not need to define the vertices for all the additional primitives needed to create the higher resolution patch, which saves on computations performed by CPU 116. Also, CPU 116 may need to transmit fewer vertices (e.g., the vertices of the control points, and not the vertices of the primitives to be added), and GPU 112 may correspondingly need to receive fewer vertices, which promotes bandwidth efficiency due to fewer accesses to system memory 114.

To perform graphics operations, GPU 112 may implement a graphics processing pipeline. The graphics processing pipeline includes performing functions as defined by software or firmware executing on GPU 112 and performing functions by fixed-function units that are hardwired to perform very specific functions. The software or firmware executing on the GPU 112 may be referred to as shaders, and the shaders may execute on one or more shader cores of GPU 112. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

As indicated above, the graphics processing pipeline illustrated in FIG. 1 is a graphic processing pipeline substantially as defined by Direct3D 11. In this example, GPU 112 may include one or more of input assembler stage 118, vertex shader stage 120, hull shader stage 122, tessellation stage 124, domain shader stage 126, geometry shader stage 128, rasterizer stage 131, pixel shader stage 132, and output merge stage 134. GPU 112 may include more stages than those illustrated, and in some examples, GPU 112 may not necessarily include all of the illustrated stages. Also, the specific ordering of the stages is provided for purposes of illustration and should not be considered limiting.

In techniques described in this disclosure, CPU 116 may output the control points of a patch to system memory 114. GPU 112 may then retrieve the control points from system memory 114. In this manner, CPU 116 may transmit the control points to GPU 112. As used in this disclosure, CPU 116 transmitting to GPU 112, or GPU 112 receiving from CPU 116 may generally include CPU 116 writing to system memory 114, from which GPU 112 receives. Alternatively, it may be possible for CPU 116 to directly transmit to GPU 112, and for GPU 112 to directly receive from CPU 116.

Input assembler stage 118 may read the control points from system memory 114 as defined by CPU 116, and assemble the control points to form the patch. For instance, input assembler stage 118 may read the coordinates, color values, and other such information of the control points. The coordinates, color values, and other such information may be commonly referred to as attributes of the control points. Based on the attributes of the control points, input assembler stage 118 may determine the general layout of the patch. In this manner, input assembler stage 118 may assemble the control points to form the patch. Input assembler stage 118 may be a fixed-function unit.

Vertex shader stage 120 may process the vertices (e.g., the control points of the patch) from input assembler stage 118. For example, vertex shader stage 120 may perform per-vertex operations such as transformations, skinning, morphing, and per-vertex lighting. Vertex shader stage 120 may be a shader.

Hull shader stage 122 receives the control points of the patch, as processed by vertex shader stage 120, process the control points, and outputs control points for a processed patch. In other words, hull shader stage 122 receives an input patch, as processed by vertex shader stage 120, processes the input patch, and outputs an output patch. Hull shader stage 122 may perform various functions for processing the input patch. For example, hull shader stage 122 may modify the coordinates of the control points to change the locations of the control points, or may even add or delete control points.

In addition, hull shader stage 122 may determine values that indicate how many primitives are to be added to the patch generated by hull shader stage 122 (i.e., the output patch). Hull shader stage 122 may utilize various criteria to determine how many primitives are to be added to the patch. Described below are two example criteria that hull shader stage 122 may utilize to determine how many primitives are to be added to the patch. However, aspects of this disclosure are not so limited, and hull shader stage 122 may utilize any criteria to determine how many primitives should be added to the patch.

As one example, hull shader stage 122 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life. In this example, hull shader stage 122 may determine that fewer primitives should be added to the patch that is further away, and more primitives should be added to the patch that is closer, relative to one another.

As another example, hull shader stage 122 may determine how many primitives should be added based on the size of the patch. For a smaller sized patch, hull shader stage 122 may determine that fewer primitives should be added because the patch encompasses a smaller area. For a larger sized patch, hull shader stage 122 may determine that more primitives should be added because the patch encompasses a larger area.

Based on a determination of how many primitives should be added, hull shader stage 122 may output a domain type and values that indicate how many primitives are to be added to the patch to tessellation stage 124. The values that indicate how many primitives are to be added to the patch, in the Direct3D 11 API, are referred to as tessfactors.

The domain may be a considered as a template shape that tessellation stage 124 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 122 may not explicitly indicate the domain type. Rather, tessellation stage 124 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by 2D Cartesian coordinates (u, v). In some examples, a triangle domain may be defined by Barycentric coordinates. Barycentric coordinates utilize three coordinates to identify any point within the triangle. For example, the vertices of the triangle domain may be defined as (u, v, w), as described below in more detail. The location of any point within the triangle is defined by vertex weighting that indicates its proximity to a vertex. For instance, the closer a point is to a vertex, the higher its vertex weighting, and the further away the point is from the vertex, the lower its vertex weighting.

As an example, assume the vertices of the triangle are defined with Barycentric coordinates (u, v, w) as follows: (1, 0, 0), (0, 1, 0), and (0, 0, 1). In this example, the center point is located at ($\frac{1}{3}$, $\frac{1}{3}$, $\frac{1}{3}$) because the center point is equally distant from each of the vertices. Also, with the given definition of the vertex coordinates, in this example, the sum of the u, v, and w coordinates for any point within the triangle domain should equal one.

The Cartesian and Barycentric coordinates are described for purposes of illustration only, and should not be considered limiting. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 124 may tessellate (e.g., divide) the domain into a plurality of primitives. It should be understood that, in this example, tessellation stage 124 is not dividing the patch outputted by hull shader stage 122 into primitives, but rather dividing the domain into the primitives. In some examples, tessellation stage 124 may not even have access to the patch outputted by hull shader stage 122. Tessellation stage 124 may be a fixed-function unit, although aspects of this disclosure need not be so limited.

Tessellation stage 124 may utilize the tessfactors outputted by hull shader stage 122 to tessellate (e.g., divide) the domain into a plurality of primitives. For example, in addition to defining the domain type (e.g., triangle or quad) the tessfactors may define how many rings are to be included within the domain.

A ring may be a series of concentric shapes within the domain, where the concentric shapes are the same shape as the domain shape. For example, if the domain shape is a quad, the perimeter of the quad may be considered as the outer ring. Hull shader stage 122 may define the number of inner rings, which may be series of smaller sized quads that reside within the quad domain. Similarly, if the domain shape is a triangle, the perimeter of the triangle may be considered as the outer ring, and the inner rings may be series of smaller sized triangles that reside within the triangle domain.

In addition to defining the number of rings within a domain, the tessfactors define the points that reside along the rings. The points that reside along the rings should not be confused with control points. The control points define the patch. The points that reside along the rings are points generated by tessellation stage 124 based on the tessfactors. These points are generated within the domain, and not within the patch.

Also, it is these points that tessellation stage 124 connects together to divide the domain into a plurality of primitives. For example, assume that the primitives that tessellation stage 124 will divide the domain into are triangles. In this example, tessellation stage 124 may connect one point that resides along the outer ring, with two points that reside along the inner ring to form a triangle primitive. Alternatively, tessellation stage 124 may connect two points that reside along the outer ring with one point that resides along the inner ring to form a triangle primitive. In this way, by defining the domain type, the number of rings within the domain, and the number of points along the outer and inner rings, hull shader stage 122 may define the number of primitives into which tessellation stage 124 should divide the domain.

In some examples, the number of points that can reside along an edge of ring may be one point to sixty-five points. For example, if the domain type is a triangle, than there may be up to 65 points per edge of the triangle domain. Similarly, if the domain type is a quad, than there may be up to 65 points per edge of the quad. However, the techniques described in this disclosure are not limited to an edge having a maximum of sixty-five points.

Furthermore, the number of points that reside along a ring may be different for outer and inner rings. For example, the number of points that reside along an edge of the outer ring may be more than or less than the number points that reside along an edge of the inner ring. It may also be possible that number of points that reside along the edge of the outer ring and the inner ring are the same number of points.

Moreover, the number points along an edge of the same ring may be different. For example, for a triangle domain, the number of points that reside along one of the edges may be different than the number of points that reside along one other edge, or both edges. Similarly, for a quad domain, the number of points that reside along one of the edges may be different than the number of points that reside along one, two, or all three other, remaining edges. It may also be possible for each of the edges of the rings to have the same number of points.

As described above, in some examples, tessellation stage 124 may not divide the patch into a plurality of primitives. Accordingly, in some examples, tessellation stage 124 may not receive any information such as the number of control points, the locations of the control points, or the size of the patch. Without any information as to the size of the patch and the locations of the control points, tessellation stage 124 may not be able to define the size of the domain that is used or the specific coordinates for the vertices of the domain.

To address this, tessellation stage 124 may rely upon a normalized coordinate system for defining the vertices of the domain, as well as for determining the locations of the interconnected points within the domain. As one example of the normalized coordinates, tessellation stage 124 may define the vertices of a quad domain, in u, v coordinates, as: (0, 0), (1, 0), (0, 1), and (1, 1), which is a unit square. Tessellation stage 124 may define the vertices of a triangle domain, in u, v, w coordinates, as: (0, 0, 1), (0, 1, 0), and (1, 0, 0), which is an equilateral triangle. Tessellation stage 124 may determine the coordinates for the interconnected vertices of the plurality of primitives in this normalized coordinate system.

Tessellation stage 124 may output the vertices of the plurality of primitives of the domain to domain shader stage 126 in the normalized coordinate system (e.g., the u, v coordinates or the u, v, w coordinates, as applicable). The function of domain shader stage 126 may be to map the vertex coordinates, as received from tessellation stage 124, on to the patch. For example, while tessellation stage 124 may not receive information of the patch as defined by hull shader stage 122, domain shader stage 126 may receive such information from hull shader stage 122.

Domain shader stage 126 may execute for each vertex coordinate outputted by tessellation stage 124. With the coordinates of the control points of the patch from hull shader stage 122, domain shader stage 126 may determine the location of the vertex, as outputted by tessellation stage 124, on the patch. Because tessellation stage 124 outputs vertices of the plurality of primitives generated by tessellation stage 124, and domain shader stage 126 adds these primitives to the patch, the combination of hull shader stage 122, tessellation stage 124, and domain shader stage 126 together add additional primitives to the patch. This results in a mesh of primitives that are added to the patch creating a higher resolution, more detailed patch, as compared to the patch defined by CPU 116. In this manner, hull shader stage 122, tessellation stage 124, and domain shader stage 126 implement a tessellation process.

As described herein, a domain may be divided into a plurality of portions, which may be same sized portions. In some examples, the techniques may output the vertices of the triangles within the portion such that if a vertex is shared between two triangles, the techniques may execute the domain shader once per vertex. In other words, if a vertex is shared between a first triangle and a second triangle within the portion, and the techniques execute the domain shader to convert the coordinates of the vertex when tessellation stage 124 outputs the vertices of the first triangle, then, the techniques may ensure that the vertex is available in the vertex reuse buffer when tessellation stage 124 outputs the vertices of the second triangle. In this manner, the techniques may execute the domain shader only once to convert the coordinates of the vertex from the coordinates in the domain to the coordinates of the patch for the shared vertex between the first and second triangles, rather than executing the domain shader when tessellation stage 124 outputs the vertex as part of the vertices of the first triangle, and then executing again the domain shader when tessellation stage 124 outputs the vertex as part of the vertices of the second triangle.

In some examples, the number of triangles within a portion may be so large or the size of the vertex reuse buffer may be too small to guarantee that vertices that are shared between triangles within the portion are available in the vertex reuse buffer when the vertices of each of these triangles is outputted by tessellation stage 124. To address this, in some examples, tessellation stage 124 may further divide a portion into sub-portions. Tessellation stage 124 may implement the vertex output scheme described in this disclosure within each of the sub-portions. For example, tessellation stage 124 may divide a portion into sub-portions such that tessellation stage 124 can ensure that shared vertices for the triangles within the sub-portion will be available in the vertex reuse buffer when tessellation stage 124 outputs the vertices of such triangles.

In this way, tessellation stage 124 may process a portion or sub-portion such that the vertex reuse buffer may be used efficiently as to minimize or reduce vertex misses which may occur when coordinates of a vertex are needed that are not stored in the reuse buffer. For example, a vertex miss may occur when coordinates of a vertex are outputted that have not been processed by the domain shader and stored in the reuse buffer. A vertex miss may also occur, for example, when a vertex has previously been processed by the domain shader and stored in the reuse buffer, but that data has been overwritten. The techniques process the vertices in such a manner to reduce the number of times a vertex is outputted that is not available in the reuse buffer by generally processing each triangle that includes a particular vertex before information on that vertex is over written in the reuse buffer. It will be understood, however, that this may not always be possible. Accordingly, some examples may attempt to decrease the number of recalculations of the data stored in the reuse buffer, rather than limit these calculations to a single domain shader invocation for each vertex. Thus, various examples may decrease the number of domain shader invocations. In some cases it may be possible to decrease the number of domain shader invocations to one per vertex, in other cases, it may only be possible to decrease, rather than eliminate recalculations in the domain shader.

Geometry shader stage 128 receives the vertices of the primitives added to the patch by domain shader stage 126 and may further generate additional vertices for the primitives to add even more resolution. Rasterizer stage 130 receives the primitives from geometry shader stage 128 and converts the primitives into pixels for the display. For example, the primitives may be defined as vectors that indicate the interconnection of the primitives, and may be defined in a coordinate space that is independent of the display on which the image is to be displayed. Rasterizer stage 130 converts these vectors into the display coordinates, and performs any additional functions such as removing points within primitives that are occluded.

Pixel shader stage 132 receives the pixels as outputted by rasterizer stage 130 and performs post processing to assign color values to each of the pixels that are to be displayed. For example, pixel shader stage 132 may receive constant values stored in system memory 114, texture data stored in system memory 114, and any other data to generate per-pixel outputs such as color values. Pixel shader stage 132 may also output opacity values that indicate the opaqueness of the pixels.

Output merge stage 134 may perform any final pixel processing. For example, output merge stage 134 may utilize depth information to further determine whether any of the pixels should be removed from being displayed. Output merge stage 134 may also perform blending operations to generate final pixel values.

Output merge stage 134 may output the final pixel values to a frame buffer, generally located within system memory 114, but which may be located within GPU 112. A display processor (not shown) may retrieve the pixel values from the frame buffer and cause pixels of a display (not shown) of device 110 to illuminate accordingly to the pixel values to cause the display to display the image.

As described above, tessellation stage 124 interconnects points of the outer and inner rings within the domain to generate a plurality of primitives within the domain. In an example, tessellation stage 124 may process domain by walking in a particular order. For example, walking may be performed such that calculated vertex information may be reused. An order for processing output primitives may be selected to efficiently (or at least more efficiently) utilize the vertex reuse buffer.

When determining an ordering of the primitives output from the tessellation stage 124, the following may be considered, for example, (1) the current tessellator speed, which may be one primitive per clock cycle, may need to be preserved to allow primitives to be processed in a timely fashion, (2) the algorithm should not be too complex, and (3) it may be preferable that changes are only made in the tessellation stage 124. In some examples no change may be made to the reuse logic. As discussed above, the reuse logic is a series of hardware comparators, e.g., exclusive-OR gates (XOR gates), that may be used to determine if vertex information needed is stored in the vertex reuse buffer. In some examples, the reuse logic may be a controller (illustrated in FIG. 9) in the reuse buffer that compares the thirty-two stored thirty-four bit indices stored in the reuse buffer with an a thirty-four bit index of an incoming vertex. It will be understood that, in other examples, the reuse buffer may be sized differently and the index may include more or fewer bits. As will discussed below with respect to FIGS. 7 and 8, quad and triangular domains, respectively, may be walked in an order selected to most efficiently (or at least more efficiently) utilize the vertex reuse buffer as to minimize vertex misses.

As described above, the tessellation unit may divide the domain into a plurality of portions, and may determine vertices of the shapes (e.g., triangles) within the portion. For example, each portions may include a plurality of shapes. These shapes may be represented by a set of shapes. For example, a plurality of sets of the shapes form the shapes within a portion.

In accordance with some of the techniques described in this disclosure, the tessellation unit may determine the coordinates of the vertices for the shapes within a first set of shapes within the portion of the domain. For each vertex, the domain shader may convert the coordinates into coordinates of the patch and store the coordinates in the reuse buffer. For shared vertices (e.g., vertices that are common to two triangles within the first set of shapes), there may be no need to execute the domain shader as the converted coordinates may already be stored in the reuse buffer.

After outputting the coordinates of vertices of the shapes within the first set of shapes, the tessellation unit may output the vertices of shapes within the second set of shapes. To minimize the execution of domain shader, the tessellation unit may output vertices of shapes in the second set of shapes such that many of the vertices of the shapes in the second set of shapes are shared with vertices of shapes in the first set of shapes. Because the first set of shapes and the second set of shapes share many vertices, the example techniques described in this disclosure may minimize the execution of the domain shader.

For instance, the first set of shapes may be located along a first edge of the portion. Again, the domain may be divided into a plurality of portions. Each of the portions may include a plurality of edges, and the first set of shapes may be located along one of the edges of one of portions (i.e., a first edge of the plurality of edges). In the techniques described in this disclosure, each shape in the second set of shapes may share at least one vertex with at least one shape of the first set of shapes. Also, none of the shapes of the second set of shapes may include a vertex on the first edge of the portion.

In the techniques described in this disclosure, the tessellation unit may walk through the first set of shapes, and then walk through the second set of shapes, where the relationship between the first set of shapes and the second set of shapes is described above. Because many vertices are shared between the first set of shapes and the second set of shapes, and the tessellation unit walk through the second set of shapes immediately after walking through the first set of shapes, many of the converted coordinates may still be available in the reuse buffer. Therefore, the number of times the domain shader is executed may be reduced.

FIG. 2 is a block diagram illustrating another example of a graphics processing unit (GPU) that may implement another example of a graphics processing pipeline in accordance with one or more examples described in this disclosure. For instance, FIG. 1 illustrated a graphics processing pipeline formulated substantially in accordance with the Direct3D 11 API. FIG. 2 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 112 includes input assembler 136, vertex shader 138, tessellation control shader 140, primitive generator 142, tessellation evaluation shader 144, geometry shader 146, clipping unit 148, rasterizer 150, fragment shader 152, and post-processor 154. Similar to FIG. 1, in the example illustrated in FIG. 2, GPU 112 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1. For instance, input assembler 136 and vertex shader 138 of FIG. 2 may function substantially similar as input assembler stage 118 and vertex shader stage 120 of FIG. 1, respectively.

For example, in FIG. 2 primitive generator 142 may be equivalent or comparable to a tessellation unit. The tessellation unit may determine a number of points that reside along a first edge of a first ring within a domain. Additionally, the tessellation unit may determine a first set of coordinates for a first portion of the points that reside along the first edge of the first ring within the domain. The tessellation unit may also determine a second set of coordinates for a second portion of the points that reside along the first edge of the first ring within the domain based on the first set of coordinates for the first portion. The tessellation unit may also be configured to stitch points that reside along the first edge of the first ring with points that reside along a second edge of a second ring to divide the domain into a plurality of primitives that are mapped to a patch.

As more examples, for tessellation, tessellation control shader 140 of FIG. 2 may function substantially similarly to hull shader stage 122 of FIG. 1. However, tessellation control shader 140 outputs tessellation levels, which may be analogous to the tessfactors of Direct3D 11. For example, the tessellation levels of OpenGL 4.x may define the domain type, the number of rings within the domain, and the number of points per ring edge.

Primitive generator 142 may function in a substantially similar manner as tessellation stage 124. For example, primitive generator 142 may utilize the tessellation levels and the domain type to divide the domain into a plurality of primitives.

Tessellation evaluation shader 144 of FIG. 2 may function substantially similarly to domain shader stage 126 of FIG. 1. For example, tessellation evaluation shader 144 may receive the vertices of the generated primitives from primitive generator 142 and add the primitive to the patch outputted by tessellation control shader 140. In this manner, the graphics processing pipeline of the OpenGL 4.x API may perform tessellation on a patch to increase the resolution of the patch. Additionally, similar to above, with respect to FIG. 3, the order of output primitives may be predetermined and implemented in, for example, a point generator, to efficiently utilize the vertex reuse buffer to minimize or at least lower vertex misses. For example, a domain may be processed by walking in a particular order such that calculated vertex information may be reused. As discussed above, the order for processing output primitives may be selected to most efficiently (or at least more efficiently) utilize the vertex reuse buffer as to minimize vertex misses. This may decrease the number of tessellation evaluation shader 144 invocations.

Geometry shader 146 may function substantially similar to geometry shader stage 128. The combination of clipping unit 148 and rasterizer 150, in FIG. 2, may function substantially similarly to rasterizer stage 30 in FIG. 3. Fragment shader 152 and post-processor 154 in FIG. 2 may function substantially similar to pixel shader stage 132 and output merge stage 134 in FIG. 3, respectively. Post-processor 154 may output the final pixel values to a frame buffer and the display processor may retrieve the pixel values from the frame buffer and cause a display to illuminate according to the pixel values to display the image.

Figure 3:
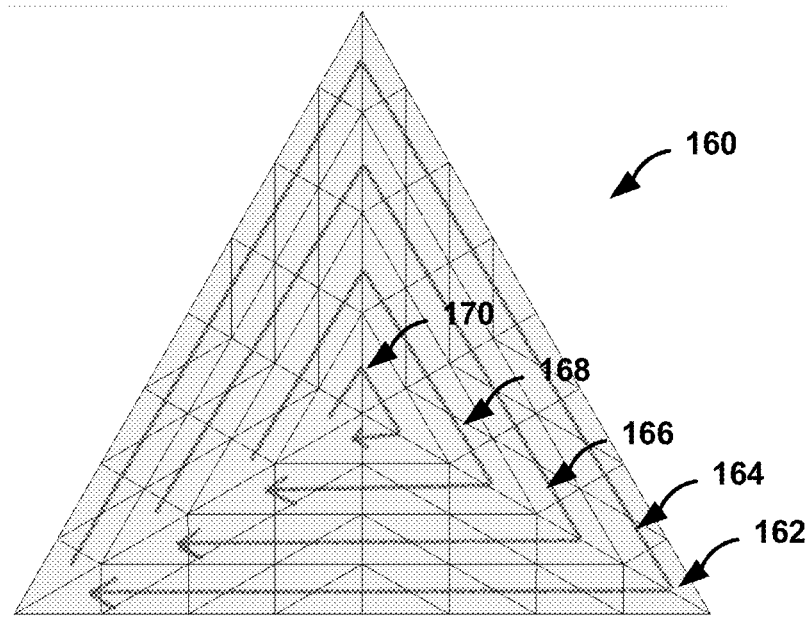
FIG. 3 is a diagram illustrating an example technique of outputting vertices for tessellation.

As described above, tessellation control shader 140, primitive generator 142, and tessellation evaluation shader 144 of FIG. 2 function substantially similar to hull shader stage 122, tessellation stage 124, and domain shader stage 126 of FIG. 3, respectively, for implementing the tessellation process. Accordingly, both the Direct3D 11 and the OpenGL 4.x APIs rely upon two programmable shader units and one fixed-function unit to implement the tessellation process.

For purposes of generality, the techniques described in this disclosure may be described with a first tessellation shader unit, a tessellation unit, and a second tessellation shader unit. Examples of the first tessellation shader unit include hull shader stage 122 and tessellation control shader 140. Examples of the tessellation unit include tessellation stage 124 and primitive generator 142. Examples of the second tessellation shader unit include domain shader stage 126 and tessellation evaluation shader 144.

Also, Direct3D 11 uses the term "tessfactors" and OpenGL 4.x uses the term "tessellation levels," which may be considered analogous terms. For purposes of generality, this disclosure uses the term "tessellation factor," examples of which include tessfactors and tessellation levels. In this way, the first shader unit may be considered as outputting tessellation factors to the tessellation unit, and the tessellation unit may output vertices to the second shader unit in response to the tessellation factors.

It should be noted that while the Direct3D 11 and OpenGL 4.x utilize two shader units and one fixed-function unit, the techniques described in this disclosure are not so limited. For example, it may be possible in other systems for the first and second shader units to be fixed-function units and the tessellation unit to be a shader unit. As another example, all may be fixed-function units or all may be shader units, or any combination thereof.

Therefore, in some examples, it may be considered that a first unit performs functions similar to the first shader unit, but may be a shader unit or a fixed-function unit, a second unit performs functions similar to the tessellation unit, but may be a shader unit or a fixed-function unit, and a third unit performs functions similar to the second shader unit, but may be a shader unit or a fixed-function unit. Moreover, although the first shader unit, the tessellation unit, and the second shader unit are illustrated as separate units in FIGS. 1 and 2, aspects of this disclosure are not so limited. These units, and possibly any unit of the graphics processing pipelines illustrated in FIGS. 1 and 2, may be combined together into a common unit. Accordingly, while the functionality of these units is described separately for ease of description, these units may be implemented in shared hardware or as distinct components.

FIG. 3 is a diagram illustrating an example technique of outputting vertices for tessellation. In the example tessellation solution of FIG. 3 the entire area of domain 160, which is a triangle domain, is divided into smaller triangles 162. Arrows 164, 166, 168, 170 illustrate an order in which the triangles 162 may be processed and mapped to the patch. Conceptually, it will be understood that the vertices of the various triangles, such as triangle 162 reside on rings that are generally made up of lines that parallel arrows 164, 166, 168, and 170. For example, triangle 162 includes two vertices that reside on an outer ring and one vertex that resides on an inner ring. More generally, some triangles may have two vertices that reside on an outer ring and one vertex that resides on an inner ring, such as triangle 162, while other triangles may have one vertex that reside on an outer ring and two vertices that resides on an inner ring.

As illustrated in FIG. 3, a point generator may process the domain by "walking" from the outmost ring, which is the boundary of the domain 160 all the way to the center ring 170. "Walking" indicates a sequence or order by which the tessellation triangles are calculated for a given tessellation level. As illustrated in FIG. 3 the sequence or order by which the tessellation triangles are calculated for a given tessellation level proceeds one ring at a time in a spiral-like fashion.

The problem with this algorithm is that, due to the limited size of vertex reuse buffer, when the algorithm finishes outputting the triangles on the first ring 164 and proceeds to the next one all the vertices on the border of first two rings 164, 166 will be vertex misses (e.g., not present in the vertex reuse buffer). In other words, a loss of vertex information occurs because the vertex buffer is not large enough to store all of the calculated coordinates.

Figure 4:
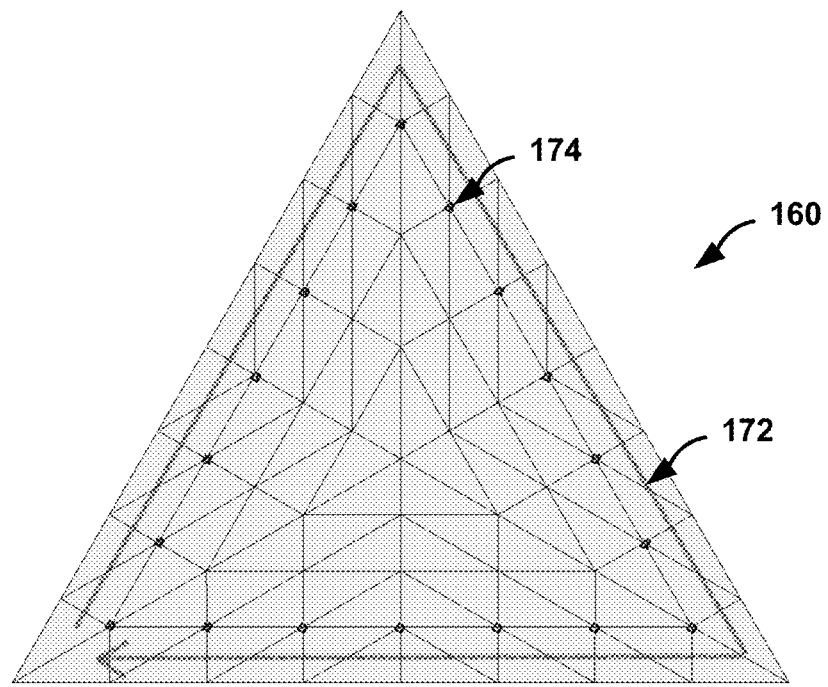
FIG. 4 is a diagram illustrating points that may need to be recalculated in the technique illustrated in FIG. 3.

FIG. 4 is a diagram illustrating points that may need to be recalculated in the technique illustrated in FIG. 3 As illustrated in FIG. 4, because of vertex misses some points may need to be recalculated. For example, when path 172 is used, each of the eighteen vertices on the interior ring, such as vertex 174, may need to be recalculated. Note that these vertices will be overwritten because when walking path 172, not only will the eighteen vertices on the interior ring be stored, but so will the twenty—four vertices on the exterior ring. Accordingly, for a vertex reuse buffer capable of storing information for thirty-two vertices, these forty-two vertices will over flow the vertex reuse buffer if the illustrated path order is used.

In an example, "walk" wider than single-width rings may be used to decrease vertex misses. For example, walking a path may represent more than just the outermost ring. A double ring may be walked, for example. Unfortunately such an approach will generally require more point generator units if it is desired to be able to process one primitive per clock cycle. Walking a "donut," e.g., processing two rows at the same time, quickly converges to 1.3 vertices per primitive and stays there. Walking even wider may not make processing much faster, only achieving at max <1.5 vertices per primitive. Additionally, hardware for such processing may consume significantly more power and occupy a lot more die area.

Figure 5A:
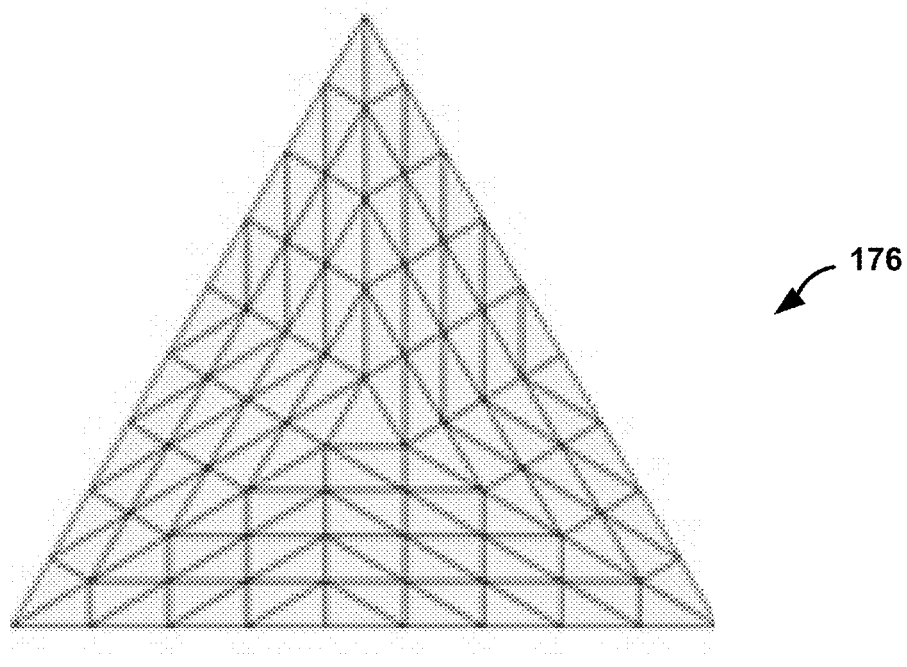
FIGS. 5A and 5B are graphical diagrams illustrating a domain divided into a plurality of primitives in accordance with one or more examples described in this disclosure.
Figure 5B:
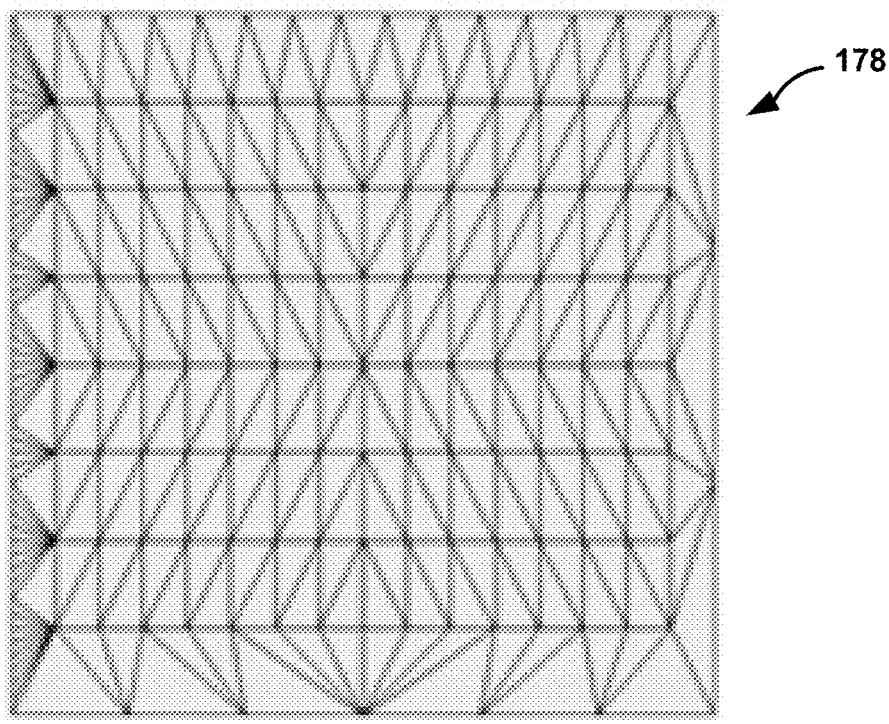

FIGS. 5A and 5B are graphical diagrams illustrating a domain divided into a plurality of primitives in accordance with one or more examples described in this disclosure. For example, FIG. 5A illustrates triangle domain 176 divided (i.e., tessellated) into a plurality of primitives, and FIG. 5B illustrates quad domain 178 divided into a plurality of primitives.

In FIGS. 5A and 5B, the interconnection of the points that form the triangle may be based on the tessellation factors. For example, the tessellation units described above may include a first unit that determines a number of points that reside along a first edge of a first ring within a domain such as the edges of the triangle domain 176 of FIG. 5A and the quad domain 178 divided illustrated in FIG. 5B. As illustrated in FIGS. 5A and 5B the domains may be divided (i.e., tessellated) into a plurality of primitives. As illustrated in FIG. 5A each edge of a triangular domain may be divided into the same number of segments. This is referred to as uniform tessellation. Quad domains may also be divided into the same number of segments and have uniform tessellation. As illustrated in FIG. 5B, however, quad domain 178 is a non-uniform tessellation.

As described in more detail below, the tessellation unit may determine a first set of coordinates for a first portion of the points that reside along the first edge of the first ring within the domain and determine a second set of coordinates for a second portion of the points that reside along the first edge of the first ring within the domain based on the first set of coordinates for the first portion. As illustrated in FIGS. 5A and 5B, different rings may be divided into different numbers of coordinates. These rings may then be walked in a way that decreases the number of domain shader invocations, as described herein. Additionally, each set of coordinates (each point) in the first portion of the points may be symmetric with a corresponding set of coordinates (point) in the second portion of the points.

The number of triangles within a portion and the size of the vertex reuse buffer may dictate if the vertex reuse buffer will overflow when processing a given portion. If the number of triangles within a portion is too large or the size of the vertex reuse buffer is too small the oldest entry may be deleted when enough vertices of each of these triangles is outputted by tessellation stage 124 to fill the vertex reuse buffer. Accordingly, the deleted entry (or entries) will not be available if that vertex information is needed. Thus, it will need to be recalculated if it is needed. To address this, in some examples, tessellation stage 124 may further divide a portion into sub-portions. Tessellation stage 124 may implement the vertex output scheme described in this disclosure within each of the sub-portions. In one example, tessellation stage 124 may divide a portion into sub-portions to ensure that all vertices for the triangles within the sub-portion may be processed without an overflow occurring. It will be understood that various vertices in the vertex reuse buffer may be overwritten when they are no longer needed. In some examples, this may be done in a first-in first-out fashion. In such an instance the oldest entry, the first in, is the first value that will be over written. Additionally, some vertices are shared between triangles.

It will be understood that the systems and methods described herein may be modified to adjust for different vertex reuse buffer sizes other than thirty-two. As described in greater detail below, the tessellation unit may also be configured to stitch points that reside along the first edge of the first ring with points that reside along a second edge of a second ring to divide the domain into a plurality of primitives that are mapped to a patch.

Figure 6:
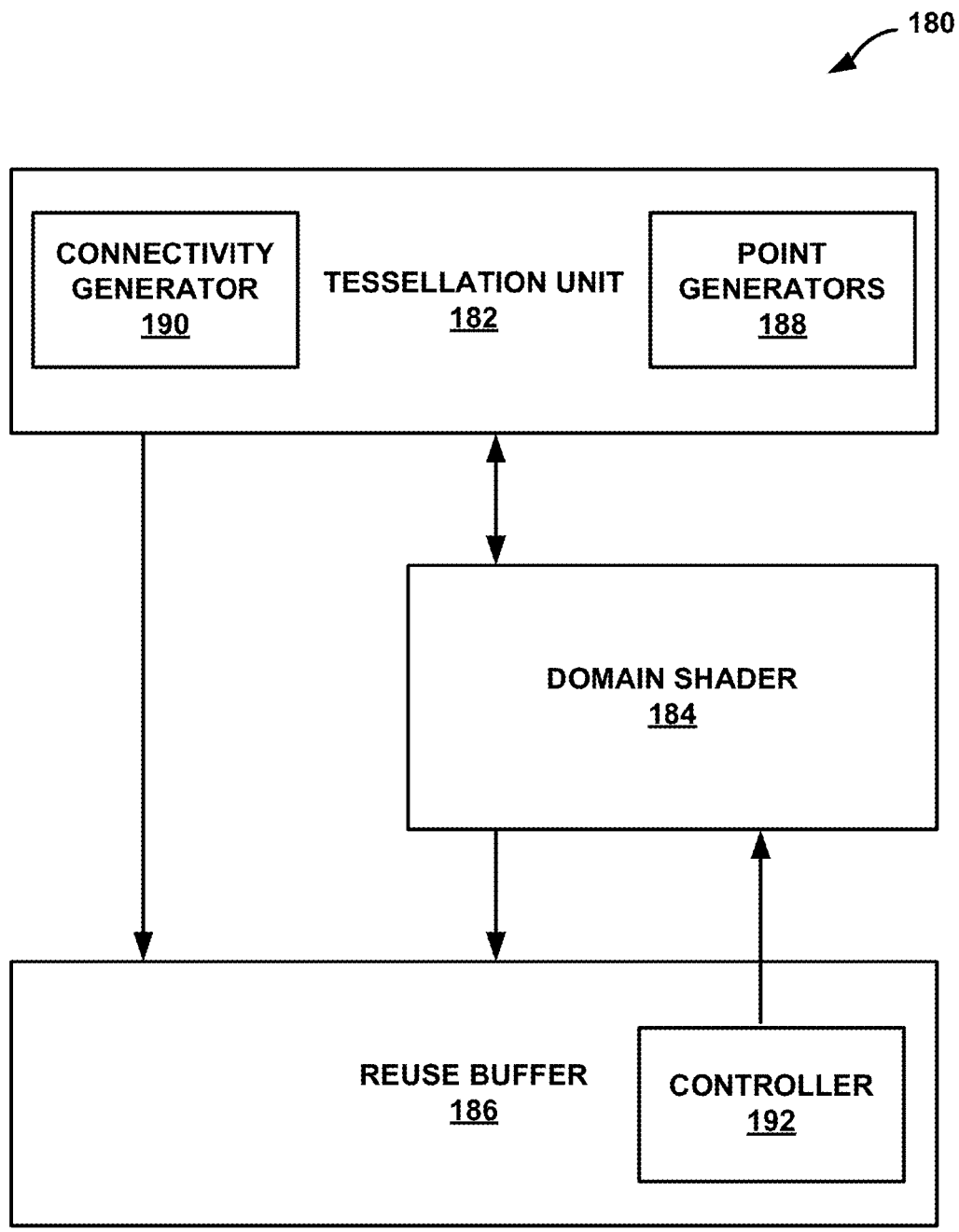
FIG. 6 is a block diagram illustrating an example of a tessellation unit connected to a vertex reuse buffer in accordance with one or more examples described in this disclosure.

FIG. 6 is a block diagram illustrating an example system or sub-system 180 including a tessellation unit 182 connected to a domain shader 184 and a vertex reuse buffer 186 in accordance with one or more examples described in this disclosure. Tessellation unit 182 may be configured to tessellate (e.g., divide) the domain into a plurality of primitives. As described herein, the tessellator unit 182 (e.g. tessellator) may divide a domain into a plurality of triangles. The domain shader 184 then may take the vertices of the triangles in the domain and convert the vertices into vertices of the patch. A pair of point generators 188, including an outer point generator and an inner point generator may process the patch by walking the tessellation triangles in a sequence or order. For example, starting with triangle 1, the outer point generator will generate the two vertical vertices of triangle 1, and the inner point generator will generate the third vertex. A connectivity generator 190 will connect the three vertices indicating that these three vertices belong to triangle 1, and output the vertices. A controller 192 of the vertex reuse buffer 186 may determine whether the outputted vertices are in the vertex reuse buffer 186 and invoke instances of the domain shader 184 for every vertex not in the vertex reuse buffer 186.

Then, the outer point generator will generate a vertex of triangle 2, and the inner point generator will generate the two vertical vertices of triangle 2. The connectivity generator 190 will connect the three vertices indicating that these three vertices belong to triangle 2, and output the vertices. The controller 192 of the vertex reuse buffer 186 will determine whether the outputted vertices are in the vertex reuse buffer 186 and invoke instances of the domain shader 184 for every vertex not in the vertex reuse buffer 186, and so forth.

The ordering of the primitive output from the tessellation unit may affect the vertex reuse at the subsequent stage. Accordingly, orderings may be selected that allow for reuse of the vertexes within the vertex reuse buffer size limit. The walking order used by the point generator may be predetermined. Additionally, the walking order used by the point generator may be an order for walking the tessellation triangles such that calculated vertex information may be reused.

Various systems, methods, and devices described herein provide for a changed order of output primitives in a way that may most efficiently utilize or may at least more efficiently utilize the vertex reuse buffer 186 as to minimize vertex misses. This may decrease the number of domain shader 184 invocations. Various examples of different walking orders, also referred to as paths, are illustrated in, for example, FIGS. 7-9, discussed below. These are only example orders, generally, any order that starts at a particular triangle in a domain, walks through additional triangles, and then walks another series of triangles, one or more of which share a vertex, may be used to increase vertex reuse.

As described above, a domain (e.g., triangle, quad) may be divided into rings. A ring may be a series of concentric shapes within the domain, where the concentric shapes are the same shape as the domain shape. For example, if the domain shape is a quad, the perimeter of the quad may be considered as the outer ring. The inner rings may be series of smaller sized quads that reside within the quad domain. Similarly, if the domain shape is a triangle, the perimeter of the triangle may be considered as the outer ring, and the inner rings may be series of smaller sized triangles that reside within the triangle domain.

Domain shader 184 may generate surface geometry from transformed control points from a hull shader and UV coordinates from tessellation unit 182. Additionally, it will be understood that UVW coordinates may be provided by the tessellation unit 182, for example, when Barycentric coordinates are used. The domain shader 184 may be invoked for each vertex generated by the fixed function tessellator unit 182. The inputs may be UV coordinates of the point on the domain, as well as all of the output data from the hull shader including control points and patch constants. The output of the domain shader 184 may be a vertex. As described above, however, because vertex reuse buffer 186 may be limited in size, when the algorithm finishes outputting, e.g., triangles on a first ring and proceeds to the next ring all the vertices on the border of first two rings may be vertex misses (e.g., not present in the vertex reuse buffer 186). In other words, a loss of vertex information occurs because the vertex reuse buffer 186 is not large enough to store all of the calculated coordinates. This may lead to additional domain shader 184 invocations unless walking is performed in such a way that calculated vertex information may be reused, as described herein.

In some examples, vertex reuse buffer 186 may be a buffer that includes memory to store thirty-two sets of calculated coordinates. It will be understood, however, that different sizes of vertex reuse buffer 186 may be used in other examples. The vertex reuse buffer 186 may be used to store coordinates calculated by the domain shader 184. Generally, the coordinates stored in the vertex reuse buffer 186 are not UV coordinates. The UV coordinates may generally be one input to the domain shader 184, which may generate surface geometry from transformed control points from a hull shader and UV (or UVW) coordinates from the tessellation unit 182. The output from the domain shader 184 may then be stored in the vertex reuse buffer 186. The UV or UVW coordinates may function as an index into reuse buffer 186.

As described herein, the vertex reuse buffer 186 may be a thirty-two location deep reuse cache. The tessellation unit may, for example, generate UV coordinates (u,v) which can be thirty-four bits (17-bits for u and 17 bits v). These thirty-four bits may be used to index of a vertex. Accordingly, the vertex reuse buffer 186 may store the UV coordinates (u, v) as an index to indicate which stored vertex information calculated by the domain shader 184 is available in the vertex reuse buffer 186.

The UV coordinates may be compared with the entry in the vertex reuse buffer 186. For example, some embodiments may use a series of comparators, e.g., XOR gates located in the vertex reuse buffer 186 to perform the comparisons used to determine if an entry is in the vertex reuse buffer 186. The reuse cache store a thirty-four bit index. The comparators may coming the thirty-four bit index with thirty-two stored thirty-four bit indices which may be stored in the vertex reuse buffer 186. If the incoming index matches what is in the reuse table, then a hit occurs. Otherwise a miss occurs. When a hit occurs the domain shader 184 does not need to be invoked because the needed information is stored in the vertex reuse buffer 186 and may be accessed from there. Otherwise, if a miss occurs the domain shader 184 will generally be invoked. In one example system comparators may be configured to compare all three triangle indices for a given triangle in parallel with all thirty-two entries in reuse table, where each entry is index (thirty-four bit).

For example, if any of thirty-two entries match the thirty-four bit index then that vertex is stored in the vertex reuse buffer 186 and does not have to be calculated (or re-calculated) by the domain shader 184. Rather, it may be read from the vertex reuse buffer 186. Otherwise a vertex miss occurs and the vertex information needs to be calculated (or re-calculated) by the domain shader 184. Additionally, one entry from reuse cache may be read out of the FIFO to make room for the newly calculated information for the vertex miss. As described, the vertex reuse buffer 186 may store vertex information calculated by the domain shader 184. This missed (u, v) may be used as a new index which is issued to the shader system for vertex processing (domain shader 184 processing).

When a vertex miss occurs the block primitive controller (PC), which may be before vertex fetcher decoder (VFD) and high level sequencer (HLSQ) sends the UV coordinates to the VFD, which may also before the HLSQ. The VFD sends the UV coordinates to the HLSQ which may also be before the shader units. The HLSQ sends the UV coordinates to the shader unit (SP) and loads the UV coordinates into a GPR. This is one fiber (one thread) out of thirty-two fibers which makes a wave. Once a wave is composed this way, it is issued for execution of domain shader 184.

Figure 7:
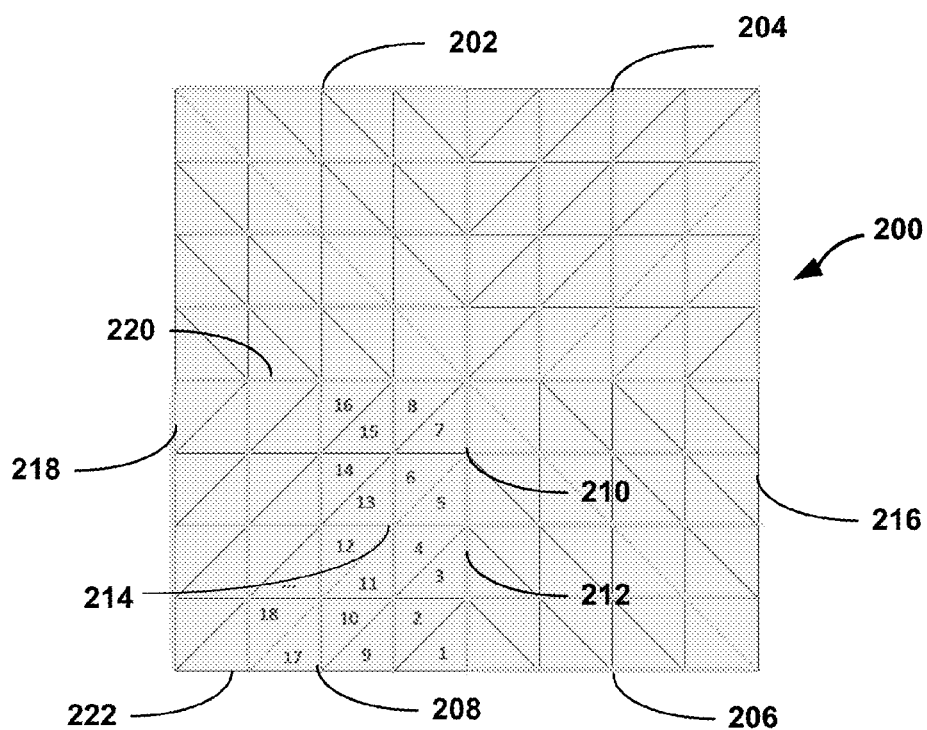
FIG. 7 is a diagram illustrating an example technique for outputting vertices of a quad domain in accordance with one or more examples described in this disclosure.

FIG. 7 is a diagram illustrating an example technique for outputting vertices of a quad domain in accordance with one or more examples described in this disclosure. The proposed approach may use a walking pattern that may be considered more complicated when compared to those discussed with respect to FIGS. 3 and 4. In FIG. 7 a walking pattern is illustrated for a quad domain. In the example illustrated in FIG. 7, the tessellation may be performed by "walking" in numerical order, e.g., 1, 2, 3, 4, etc. Such an order will allow for the reuse of values in the vertex reuse buffer 186, which decreases the need for recalculating vertices.

As illustrated in FIG. 7, quad domain 200 may be divided into four different portions 202, 204, 206, 208. Each portion 202, 204, 206, 208, may be processed separately. For the purposes of this discussion, portion 208 will be considered a first portion. It will be understood that any of the portions 202, 204, 208, 208 may be considered the first portion.

Referring now to portion 208, the tessellation may be performed by walking in numerical order, starting for example at an outer edge, at "1" and proceeding inward, e.g., 2, 3, 4, 5, 6, 7, 8. For example, a tessellation unit may divide the domain into a plurality of portions, including a first portion. The tessellation unit may determine coordinates for vertices for a first set of shapes that reside within the first portion (e.g., the first set of shapes include the triangles labeled 1 to 8), wherein each shape of the first set of shapes includes at least one vertex on a first edge of the first portion. After determining coordinates for the vertices for the first set of shapes, the tessellation unit may determine coordinates for vertices for a second set of shapes that reside within the first portion (e.g., the second set of shapes include the triangles labeled 9 to 16). Each shape of the second set of shapes shares at least one vertex with at least one shape of the first set of shapes. Further, none of the shapes of the second set of shapes includes a vertex on the first edge of the first portion. This may allow for additional vertices to be processed while vertex information for those vertices is still in the vertex reuse buffer 186.

The vertex reuse buffer 186 may store thirty-two sets of coordinates calculated by the domain shader 184. Accordingly, as the tessellation unit 182 (e.g., point generators 188 and connectivity generator 190) walks from, for example outer edge at 9 inward to 16 each of the 8 values for 1 to 8 may be available in the vertex reuse buffer 186. Additionally, in some examples, values along an edge of portion 206 that is shared with portion 208 may be available in the vertex reuse buffer 186 when walking from 1 to 8 in portion 208. After walking from 9 to 16 the tessellation may continue by walking in numerical order, starting for example at the outer edge, at "17" and proceeding inward.

In the illustrated example of FIG. 7, each portion 202, 204, 206, 208 includes a number of triangles. In the example each set of values calculated for the portion 202, 204, 206, 208 may be stored in the vertex reuse buffer 186 for use while that portion is being processed. (Note again that the vertex reuse buffer 186 may include, for example, thirty-two storage locations for the calculated vertex information.)

As illustrated in FIG. 7, portion 208 has a small enough number of triangles to allow the entire portion 208 to be walked without overflowing the vertex reuse buffer 186. More specifically, the number of vertices that need to be stored is small enough that the vertex reuse buffer 186 does not overflow, assuming a vertex reuse buffer with, for example, thirty-two storage spaces. It will be understood that, although a triangle has three vertices, because of vertex sharing between triangles, the total number of vertices that need to be stored will generally not be three times the number of triangles in a portion or sub-portion. Additionally, it will also be understood that some vertices in a portion or sub-portion may be overwritten without requiring a subsequent domain shader invocation, e.g., when the vertex information for that vertex is no longer needed.

As triangles are walked from 1 to 8, ten vertices will be stored, leaving twenty-two storage spaces. As triangles 9 to 16 are walked, five of the needed vertices will already be available in the vertex reuse buffer 186 and the domain shader 184 will not need to be invoked to calculate them. Additionally, five of the vertices from triangles 1 to 8 will not be needed to calculate triangles 9 to 16 and these may be discarded from the vertex reuse buffer 186. In other words, the vertices along first edge 212 may be discarded. It will be understood that these vertices might need to be recalculated when processing portion 206, however, they are not needed again form the processing of portion 208. The process can continue in numerical order, reusing vertices as needed and discarding vertices when they are not needed to process the portion 208.

In another example however, information related to vertices along one or more edges of a portion 202, 204, 206, and 208 might be maintained for use in processing another portion 202, 204, 206, and 208. For example first edge 212 is an edge shared by portion 206 and 208. In some cases it may be possible to maintain vertex information for vertices along first edge 212 for use in processing both portion 206 and 208. More specifically, triangles 1 to 8 might be walked and information for ten vertices may be stored. Then triangles 9 to 16 may be walked and an information for an additional five vertices might be stored. Triangles 9 to 16 share five vertices with triangles 1 to 8. The total number of vertices now stored might be fifteen, assuming no information was stored in the vertex reuse buffer before starting to process portion 208. Note that the vertex reuse buffer 186 has not overflowed and that the entire portion 208 might be processed without discarding any vertex information. If portion 206 is processed next, the vertex information for the vertices along first edge 212 may still be available in the vertex reuse buffer 186. While vertex information for the entire portion 208 might be stored the vertex reuse buffer 186, it may still be useful to over right vertex information that is no longer needed.

The tessellation unit 182 may include two point generators 188 (inner and outer) and a connectivity generator 190. As discussed herein, the triangle may be walked in numerical order. For example in one system triangles 1 to 8 may be walked first. In the quad domain 200 the outer point generator may generate the vertices to the right of the triangles 1 to 8 of quad domain 200 and the inner point generator may generate vertices to the left of triangles 1 to 8 of quad domain 200. The connectivity generator 190 in the tessellation unit 182 may stitch triangles 1-8 together, taking vertices from both inner and outer point generator outputs.

More specifically, starting with triangle 1, the outer point generator will generate the two vertical vertices of triangle 1, and the inner point generator will generate the third vertex. The connectivity generate will connect the three vertices indicating that these three vertices belong to triangle 1, and output the vertices. A controller 192 in the vertex reuse buffer 186 (i.e. vertex reuse logic) will determine whether the outputted vertices are in the vertex reuse buffer 186 and invoke instances of the domain shader 184 for every vertex not in the vertex reuse buffer 186.

Then, the outer point generator will generate a vertex of triangle 2, and the inner point generator will generate two vertical vertices of triangle 2. The connectivity generator 190 will connect the three vertices indicating that these three vertices belong to triangle 2, and output the vertices. The controller 192 of the vertex reuse buffer 186 will determine whether the outputted vertices are in the vertex reuse buffer 186 and invoke instances of the domain shader 184 for every vertex not in the vertex reuse buffer 186, and so forth.

In this example, the point generators 188 and the connectivity generator 190 first constructing triangle 1, then constructing triangle 2, by "walking" from triangle 1 to triangle 2 and then continuing numerically walking though triangle 3 to 8. Accordingly, triangles 1 to 8 may be considered a first set of shapes that reside within a first portion (portion 208 in this example). As illustrated in FIG. 7, the first set of shapes that reside within the first portion include at least one vertex, e.g., 210 (and sometimes two) on a first edge 212 of first portion 208. For example, vertex 210 is a vertex of triangles 6, 6, and 7. Triangles 5 and 7 include two vertices on first edge 212, while triangle 6 includes only one vertex on first edge 212.

Then the point generators 188 will "walk" triangles 9 to 16 in generally the same fashion. Triangles 9 to 16 may be considered a second set of shapes that reside within the first portion 208. The outer point generator may generate the vertices to the right of the triangles 9 to 16 of quad domain 200, and the inner point generator may generate vertices to the left of triangles 9 to 16 of quad domain 200. The connectivity generator 190 in the tessellation unit 182 may start stitching triangles 9 to 16, taking vertices from both inner and outer point generator outputs. This process may continue for the rest of the triangles in portion 208 and with triangles in other portions, 202, 204, 206. As illustrated in FIG. 7, each shape of the second set of shapes (triangles 9 to 16) shares at least one vertex with at least one shape of the first set of shapes, e.g., vertex 214. Additionally, as illustrated in FIG. 7, none of the shapes of the second set of shapes includes a vertex on the first edge 212 of the first portion 208.

In an example, the first edge 212 may reside between two boundaries 216, 218, of the quad domain 200. Additionally, the first portion 208 may include four edges, such that a first 212 and second edge 220 of the at least four edges reside within boundaries of the domain and wherein a third and fourth edge of the four edges each reside on the boundaries of the domain 218, 222.

It will be understood that portions 202, 204, 206, and 208 may be processed in various orders. The example walking schemes generally results in fewer invocations of the domain shader 184 because more vertices are available in the vertex reuse buffer 186 as compared to walking around the rings. It will also be understood that the sets of shapes may be processed in various orders other than 1 to 8, followed by 9 to 16, 17 to 24, and 25 to 32. For example, 25 to 32 might be considered the first set of shapes and shapes 17 to 24 might be considered the second set of shapes. Additionally, the orientation of the sets of shapes might me changes, e.g., triangles 1, 2, 9, 10, 17, 18, 25, 26 might be a first set of shapes. Further, it will also be understood that portions might be sized differently than in the example of FIG. 7.

Figure 8:
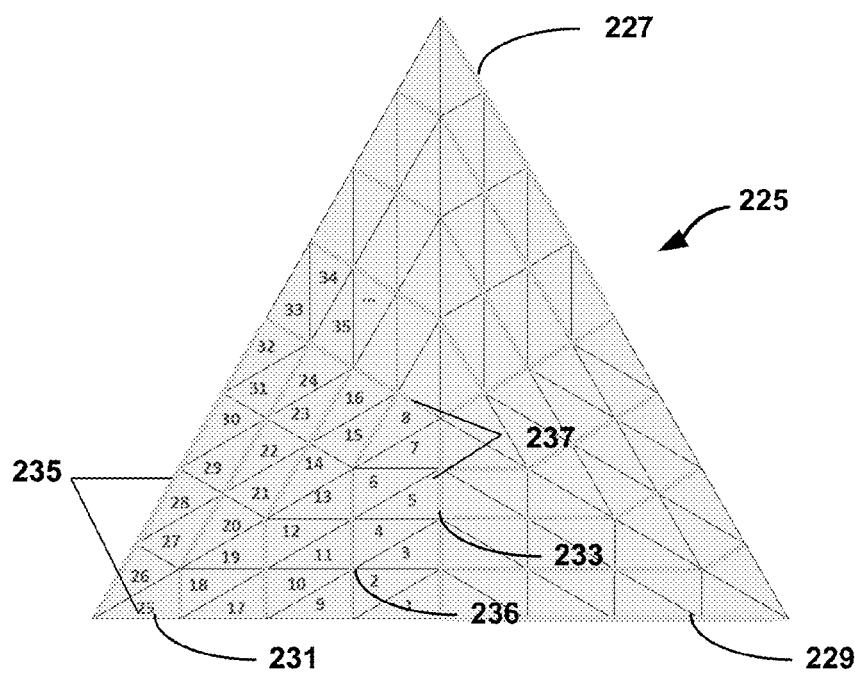
FIG. 8 is a diagram illustrating an example technique for outputting vertices of a triangle domain in accordance with one or more examples described in this disclosure.

FIG. 8 is a diagram illustrating an example technique for outputting vertices of a triangle domain in accordance with one or more examples described in this disclosure. The proposed approach may use a walking pattern that may be considered more complicate when compared to those discussed with respect to FIGS. 3 and 4. In FIG. 8 a walking pattern is illustrated for a triangle domain. In the example illustrated in FIG. 8, the tessellation may be performed by "walking" in numerical order, e.g., 1, 2, 3, 4, etc. Such an order will allow for the reuse of values in the vertex reuse buffer 186, which decreases the need for recalculating vertices.

As illustrated in FIG. 8, triangular domain 225 may be divided into three different portions 227, 229, 231. Each portion 227, 229, 231, may be processed separately. For purposes of this example, portion 231 may be considered the first portion, however, it will be understood that any of portions 227, 229, 213 might be considered the first portion. Referring now to portion 231, the tessellation may be performed by walking in numerical order, starting for example at an outer edge, at "1" and proceeding inward, e.g., 2, 3, 4, 5, 6, 7, 8.

Similar to the discussion of FIG. 7, above, a tessellation unit may determine coordinates for vertices for a first set of shapes (e.g., triangles 1 to 8) that reside within the first portion 231. Each shape of the first set of shapes includes at least one vertex on a first edge 233 of the first portion. After determining coordinates for the vertices for the first set of shapes (triangles 1 to 8), determine coordinates for vertices for a second set of shapes (triangles 9 to 16) that reside within the first portion 231. Each shape of the second set of shapes (triangles 9 to 16) shares at least one vertex with at least one shape of the first set of shapes (triangles 1 to 8), for example, vertex 236. Additionally, none of the shapes of the second set of shapes includes a vertex on the first edge 233 of the first portion 231. FIG. 8 illustrates boundaries 235 of triangular domain 225. Additionally, as illustrated in FIG. 8, two edges 237 reside within the boundaries 235 of the triangular domain 225.

The vertex reuse buffer 186 may store thirty-two sets of coordinates calculated by the domain shader 184. Accordingly, as the point generator walks from, for example outer edge at 9 inward to 16 each of the 8 values for 1 to 8 may be available in the vertex reuse buffer 186. Additionally, in some examples, values along an edge of portion 229 that is shared with portion 231 may be available in the vertex reuse buffer 186 when walking from 1 to 8 in portion 231. After walking from 9 to 16 the tessellation may continue by walking in numerical order, starting for example at the outer edge, at 17 and proceeding inward to 24, followed by 25 to 31. Portion 227 may then be walked following a path 33, 34, 35, etc. It will be noted that this path allows for reuse of calculated values for the edge between 231 and 227. (Note again that the vertex reuse buffer 186 may include, for example, thirty-two storage locations for the sets of calculated vertex information.)

As discussed herein, the tessellation unit 182 may include two point generators 188 (inner and outer) and a connectivity generator 190 unit. In the triangle domain 225 the outer point generator may generate the vertices to the right of the triangles 1 to 8 of triangle domain 225, and the inner point generator may generate vertices to the left of triangles 1 to 8 of triangle domain 225. The connectivity generator 190 in the tessellation unit 182 may start stitching triangles 1-8, taking vertices from both inner and outer point generator outputs. Then the point generators 188 will "walk" triangles 9 to 16. This process may continue for the rest of the triangles in portion 231 and with triangles in other portions, 227, 229. It will be understood that portions 227, 229, and 231 may be processed in various orders.

Similar to the discussion of the example of FIG. 7, in the example of FIG. 8 portion 231 has a small enough number of triangles to allow the entire portion to be walked without overflowing the vertex reuse buffer 186. As triangles are walked from 1 to 8, ten vertices will be stored, leaving twenty-two storage spaces. As triangles 9 to 16 are walked, five of the needed vertices will already be available in the vertex reuse buffer 186 and the domain shader 184 will not need to be invoked to calculate them. Additionally, five of the vertices from triangles 1 to 8 will not be needed to calculate triangles 9 to 16 and these may be discarded from the vertex reuse buffer 186. Accordingly, each set of values calculated for the portion 227, 229, 231 may be stored in the vertex reuse buffer 186 for use while that portion is being processed. FIGS. 7 and 8 illustrate quad and triangular examples respectively for a low tessellation level. An example for tessellation levels greater than 30 is illustrated with respect to FIG. 9, discussed below.

Figure 9:
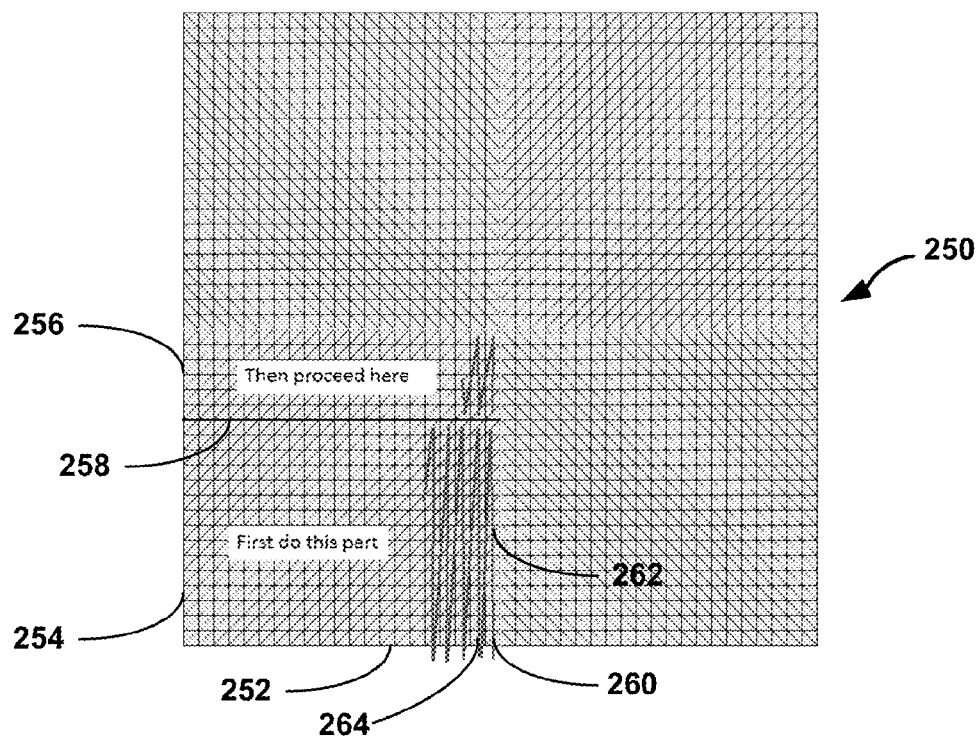
FIG. 9 is a diagram illustrating another example technique for outputting vertices of a quad domain in accordance with one or more examples described in this disclosure.

FIG. 9 is a diagram illustrating another example technique for outputting vertices of a quad domain in accordance with one or more examples described in this disclosure. FIG. 9 illustrates an example for tessellation levels greater than 30. In each of the low tessellation level examples of FIGS. 7 and 8 discussed above, the tessellation may be performed by "walking" in numerical order, 1, 2, 3, 4, etc. Such an order will allow for the reuse of the buffer, which decreases the need for recalculating vertices. In examples for Tessellation levels greater than thirty it may be impractical to walk all the way to the center, so in one example a system may have to partition the walks of height e.g. 15 (or 30 triangles per walk). This is illustrated in FIG. 9.

For example, quad domain 250 may be divided into four portions, including portion 252. The portions may be further divided into sub-portions, such as 254 and 256. In this way each sub-portion may be walked separately to allow for vertex reuse from the data stored in the vertex reuse buffer 186. It will be understood, however, that some regeneration of the vertex data may be necessary, for example, at the boundary 258 between sub-portion 254 and 256. For example, a tessellation unit may determine coordinates for vertices for a first set of shapes of a first sub-portion 260. The first set of shapes of the first sub-portion reside within the first sub-portion 258. Each shape of the first set of shapes of the first sub-portion 260 includes at least one vertex on a first edge 262 of the first sub-portion 254. After determining coordinates for the vertices for the first set of shapes of a first sub-portion 254, the tessellation unit may determine coordinates for vertices for a second set of shapes of the sub-portion 264 that reside within the first sub-portion 260. None of the shapes of the second set of shapes of a first sub-portion 264 includes a vertex on the first edge 262 of the first sub-portion 254.

As described herein, there is a relationship between the vertex reuse buffer 186 size and the path selected. Larger vertex reuse buffers may allow for longer walking paths, for example. It may be preferable, however, not to increase the size of the vertex reuse buffer size. For example, larger reuse buffer sizes may increase the complexity of vertex reuse logic used to determine what information is being stored in the vertex reuse buffer 186. Additionally, the vertex reuse buffer 186 may be a fixed size. For example, the vertex reuse buffer 186 may be in a separate component from the tessellation unit and it may be preferable to avoid redesign of the component that includes the vertex reuse buffer 186.

Figure 10:
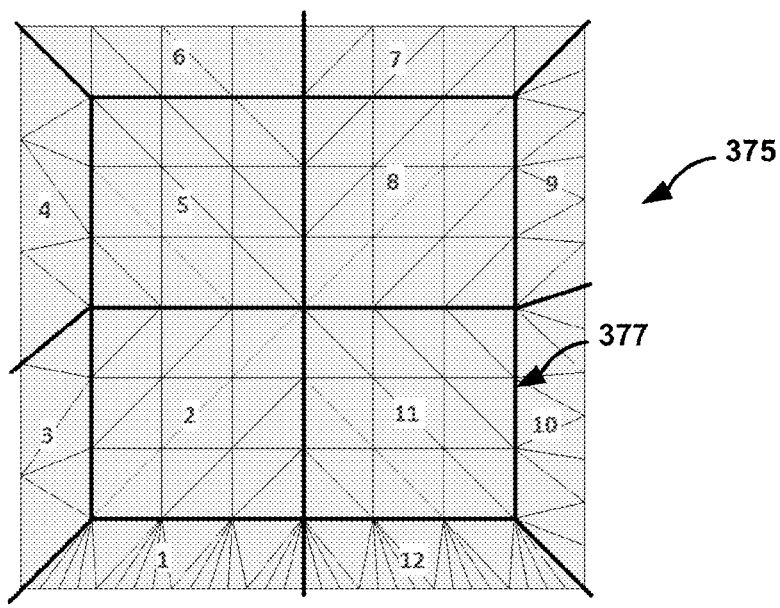
FIG. 10 is a diagram illustrating another example technique for outputting vertices of a quad domain in accordance with one or more examples described in this disclosure.

FIG. 10 is a diagram illustrating another example technique for outputting vertices of a quad domain 375 in accordance with one or more examples described in this disclosure. In a non-uniformed tessellation case edges of a domain have different tessellation factors, the interior has different tessellation factors from the edge, or both. For example, in cases where edges have different tessellation factor than the interior, the system might not walking in the manor demonstrated with respect to FIGS. 7-9. Rather, such a case may be processed by handling the outmost ring or portions of the outer most ring, where the irregularity occurs, and then handling the interior of the domain. For example, as illustrated in FIG. 10, one example of the algorithm may proceed in numerical order, starting with edge 1, and proceeding through areas 2, 3, 4 . . . 12. Note that, unlike FIGS. 7-8, as illustrated in FIG. 10, the number 1 to 12 indicate an example order for processing areas made up of a number of triangles, rather than an order for the individual triangles themselves. Accordingly, essentially each quadrant of a quad (or $\frac{1}{3}^{rd}$ of the triangle case, not illustrated) will be sandwiched between its two neighboring half edges. Generally, tessellation may be performed in a walking order that generally reuses data stored in the vertex reuse buffer 186. For example, walks in order 1 to 12 may reuse much of the data calculated along the border 377 between the different portions of quad domain 375.

Figure 11:
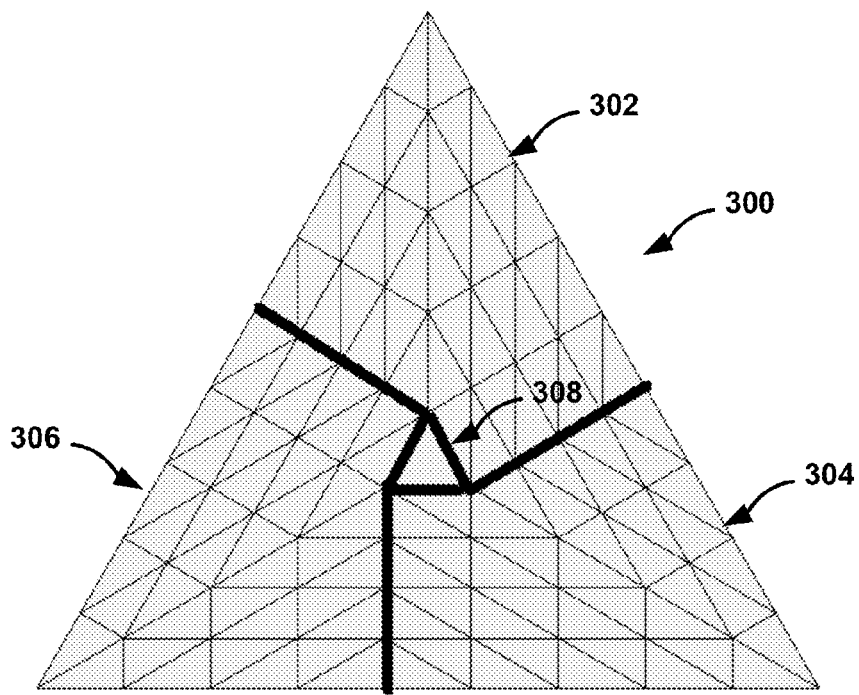
FIG. 11 is a diagram illustrating an example technique for a triangle domain having an edge with an odd number of segments in accordance with one or more examples described in this disclosure.
Figure 12:
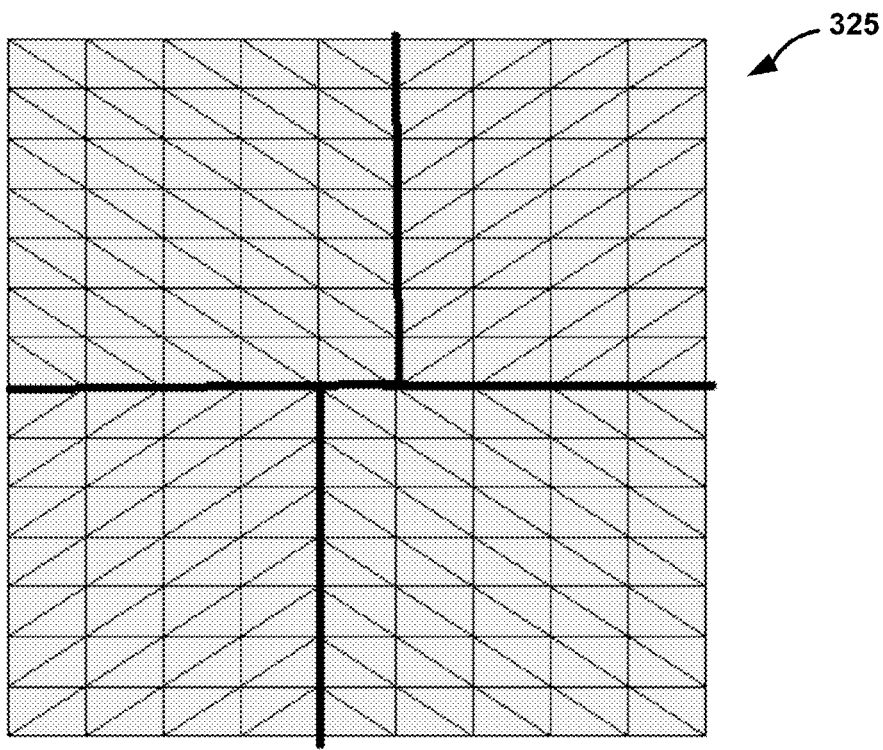
FIG. 12 is a diagram illustrating an example technique for a quad domain having an edge with an odd number of segments in accordance with one or more examples described in this disclosure.

FIG. 11 is a diagram illustrating an example technique for a triangle domain having an edge with an odd number of segments in accordance with one or more examples described in this disclosure. FIG. 12 is a diagram illustrating an example technique for a quad domain having an edge with an odd number of segments in accordance with one or more examples described in this disclosure.

As illustrated in FIGS. 11 and 12, domains with odd side lengths may be split off the central axis. In such examples, the point generator may process a patch by walking each portion separately. This is not intended to indicate that the order may not be selected such that reuse may occur between different portions of the patch, triangle 300 or quad 325. The ordering of the primitive output from the tessellation unit may affect the vertex reuse at the subsequent stage. Accordingly, orderings may be selected that allow for reuse of the vertexes within the vertex reuse buffer size limit. As described herein, walking may be performed such that calculated vertex information may be reused.

For example, as illustrated in FIG. 11, triangle 300 may include portions 302, 304, 306, and center 308. Portions 302, 304, 306, and center 308 may be walked separately. For example, a walking scheme from outside edge to the interior may be used such as ones generally similar to the walking scheme discussed with respect to FIG. 8. The center may be walked separately. As will be understood, some reuse may be possible between center 308 and at least one of portions 302, 304, 306. It should also be understood that, while not necessary in the specific example of FIG. 11, the concepts discussed with respect to FIGS. 9 and 10 may be applied as necessary to deal with larger tessellation values and non-uniform tessellation. For example, in each portion 302, 304, 306, the tessellation unit may walk from an edge to the interior at a boarder with another portion without overflowing the vertex reuse buffer 186 when, for example, the number of vertices is smaller than the size of the vertex reuse buffer 186. Again, it will be understood that, although a triangle has three vertices, because of vertex sharing between triangles, the total number of vertices that need to be stored will generally not be three times the number of triangles in a portion or sub-portion. Accordingly, reuse may generally occur similar to the discussion of FIG. 8. If necessary, however, portions of a domain with odd side lengths and larger tessellation factors may be further divided into sub-portions as discussed with respect to FIG. 9. Note that center 308 is a single triangle and accordingly, may be handled without further dividing. In some examples, with higher tessellation values, however, different divisions into portions and sub-portions may be possible. Non-uniform tessellations for a domain including an edge with an odd number of segments is also possible.

As illustrated in FIG. 12, quad 325 may include portions 327, 329, 331, 333. Portions 327, 329, 331, 333 may be walked separately. For example, a walking scheme from outside edge to the interior may be used such as ones generally similar to the walking scheme discussed with respect to FIG. 7. It should also be understood that, while not necessary in the specific example of FIG. 12, the concepts discussed with respect to FIGS. 9 and 10 may be applied as necessary to deal with larger tessellation values and non-uniform tessellation. For example, in each portion 327, 329, 331, 333, the tessellation unit may walk from an edge to the interior at a boarder with another portion while processing a low enough number of vertices such that the vertex reuse buffer 186 is not overflowed. Accordingly, reuse may generally occur similar to the discussion of FIG. 7. If necessary, however, portions of a domain with odd side lengths and larger tessellation factors may be further divided into sub-portions as discussed with respect to FIG. 9. Non-uniform tessellations for a domain including an edge with an odd number of segments is also possible.

In another example, a uniform walking scheme will give us better results than the non-uniform one, one example system may, at the setup stage of the tessellation unit 182, determine a flag as to whether all tessellation factors are equal or not. Since most applications do not make use of adaptive tessellation, this will give us performance advantage.

Figure 13:
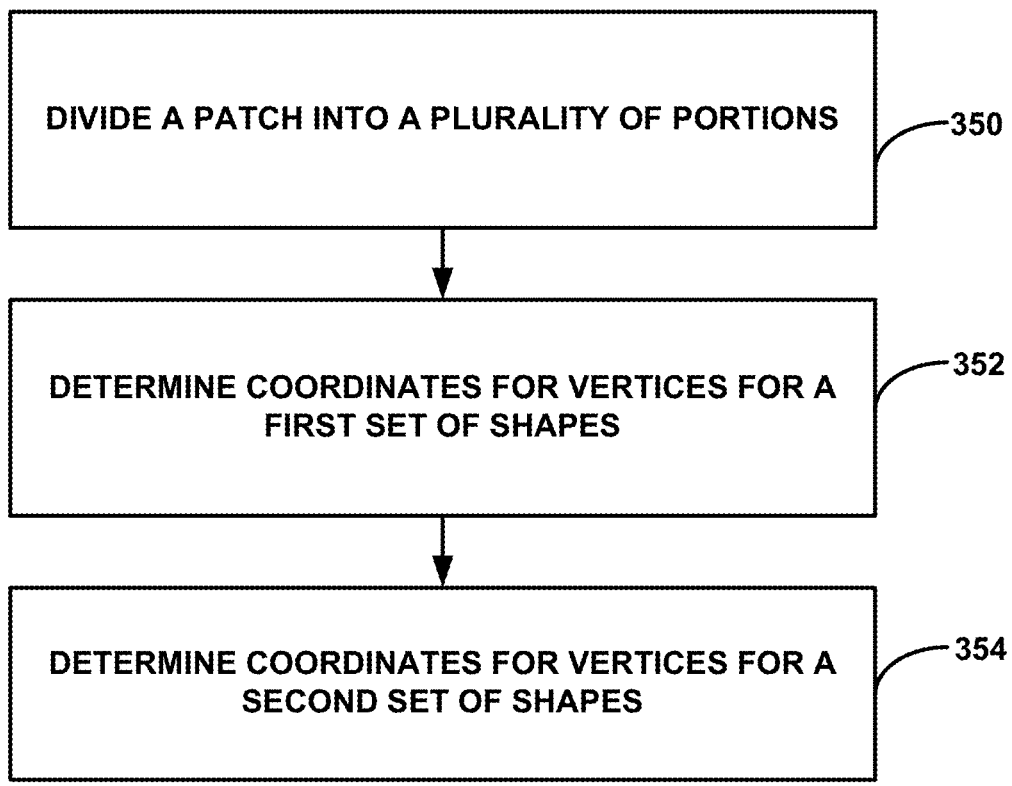
FIG. 13 is a flow chart illustrating an example method of tessellating a domain in accordance with one or more examples described in this disclosure.

FIG. 13 is a flow chart illustrating an example method for tessellation in accordance with one or more examples described in this disclosure. For purposes of illustration only, reference is made to FIG. 6. As described above, FIG. 6 provides an example of a tessellation unit. Examples of the tessellation unit include tessellation stage 124 of FIG. 1 and primitive generator 142 of FIG. 2, as well as tessellation unit 182 of FIG. 6.

In an example system, a tessellation unit may divide a patch into a plurality of portions (350). In some cases, for example, the tessellation unit may divide a quad domain into four portions. Similarly, in another example the tessellation unit may divide a triangular domain into three portions. In some cases, the tessellation unit may then further divided a quad or triangular domain into sub-portions. In this way a portion or sub-portion may be processed in groups such that the vertex reuse buffer 186 may be used efficiently as to minimize or reduce vertex misses. This may decrease the number of domain shader 184 invocations. For example, a portion or sub-portion may have a small enough number of triangles to fewer than thirty-two pairs of triangles, allowing the entire portion or sub-portion to be walked without overflowing the vertex reuse buffer. It will be understood that, although a triangle has three vertices, because of vertex sharing between triangles, the total number of vertices that need to be stored will generally not be three times the number of triangles in a portion or sub-portion. Additionally, it will also be understood that some vertices in a portion or sub-portion may be overwritten without requiring a subsequent domain shader invocation, e.g., when the vertex information for that vertex is no longer needed.

In some examples, the number of triangles within a portion may be so large or the size of the vertex reuse buffer may be too small to guarantee that vertices that are shared between triangles within the portion are available in the vertex reuse buffer when the vertices of each of these triangles is outputted by tessellation stage 124. To address this, in some examples, tessellation stage 124 may further divide a portion into sub-portions. Tessellation stage 124 may implement the vertex output scheme described in this disclosure within each of the sub-portions. For example, tessellation stage 124 may divide a portion into sub-portions such that tessellation stage 124 can ensure that shared vertices for the triangles within the sub-portion will be available in the vertex reuse buffer when tessellation stage 124 outputs the vertices of such triangles.

Additionally, the plurality of portions may include a first portion, which may be the first portion to be processed. In an example, the first portion may be portion 208 of FIG. 7 or portion 231 of FIG. 8. As discussed above, the first portion may be processed in order by walking triangles 1 to 8, followed by triangles 9 to 16, 17 to 24, and 25 to 32.

In an example system, a tessellation unit may determine coordinates for vertices for a first set of shapes that reside within the first portion (352). In an example, each shape of the first set of shapes may include at least one vertex on a first edge of the first portion, such as first edge 212 of FIG. 7 or first edge 233 of FIG. 8.

Depending in the ordering of the primitive output from the tessellation unit the vertex information stored in the vertex reuse buffer 186 may be reused at the subsequent stage. Accordingly, orderings may be selected that allow for reuse of the vertexes within the vertex reuse buffer size limit. As discussed above, it may be advantageous to not increase the buffer size.

The tessellation unit may determine coordinates for vertices for a second set of shapes that reside within the first portion (354). This may occur after determining coordinates for the vertices for the first set of shapes (352). Each shape of the second set of shapes shares at least one vertex with at least one shape of the first set of shapes. Further, none of the shapes of the second set of shapes includes a vertex on the first edge of the first portion. The order of output primitives may efficiently utilize the vertex reuse buffer 186 as to minimize vertex misses (e.g., needed vertex information not present in the vertex reuse buffer 186). This may decrease the number of domain shader 184 invocations by increasing reuse of previously calculated information stored in the vertex reuse buffer 186. Decreasing the number of domain shader 184 invocations may save power and increase performance.

Generally, reuse may be accomplished by dividing a patch into smaller and smaller portions or sub-portions until a number of triangles can be "walked" as one set without over flowing the vertex reuse buffer 186. For example, a portion or sub-portion may have a small enough number of triangles to allow the entire portion or sub-portion to be walked without overflowing the vertex reuse buffer. Although a triangle has three vertices, because of vertex sharing between triangles, the total number of vertices that need to be stored will generally not be three times the number of triangles in a portion or sub-portion. Additionally, some vertices in a portion or sub-portion may be overwritten without requiring a subsequent domain shader invocation, e.g., when the vertex information for that vertex is no longer needed. (Vertex reuse buffer 186 may generally have thirty-two storage locations in some examples.) Alternatively, a portion or sub-portion may be sized such that, for example, the portion or sub-portion may be walked from an edge to a predetermined interior location while only filling half of the vertex reuse buffer 186 so that that stored information may be used as another part is walked from edge to a predetermined interior location and the other half of the vertex reuse buffer 186 is filled. In yet another example, one or more portions or sub-portions of a patch may be sized such each pass nearly fills the vertex reuse buffer 186 and, in a subsequent pass, vertex information in the vertex reuse buffer 186 may be used and then overwritten by new vertex information. Additional more specific examples are provided herein.

Figure 14:
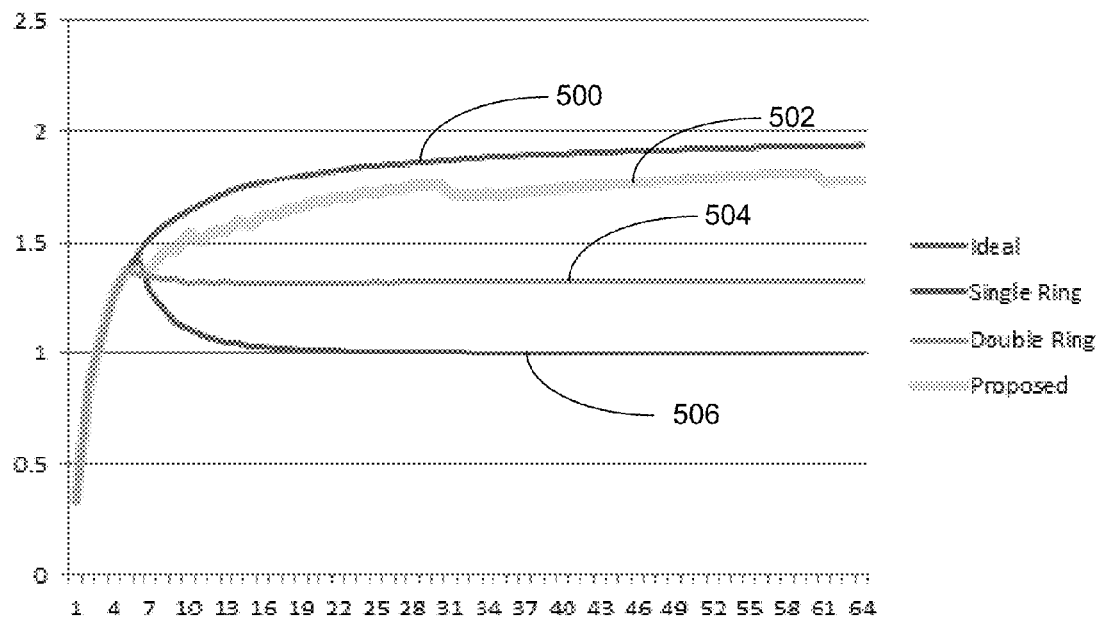
FIG. 14 is a diagram illustrating a comparison between an example algorithm in accordance with one or more examples described in this disclosure to other possible walking schemes.

FIG. 14 is a diagram illustrating a comparison between an example algorithm in accordance with one or more examples described in this disclosure and other possible walking schemes. The diagram provides an illustration of the ideal reuse case 500, an example of the current approach 502, walking double rings 504 and walking a single ring 506. The example is for a triangle domain with uniform tessellation levels 1 . . . 64 (i.e. same tessellation factors on all edges and interior). As illustrated in FIG. 14, the vertical axis is the ratio of number of primitives divided by number of vertex misses. The horizontal axis is tessellation level.

Figure 15:
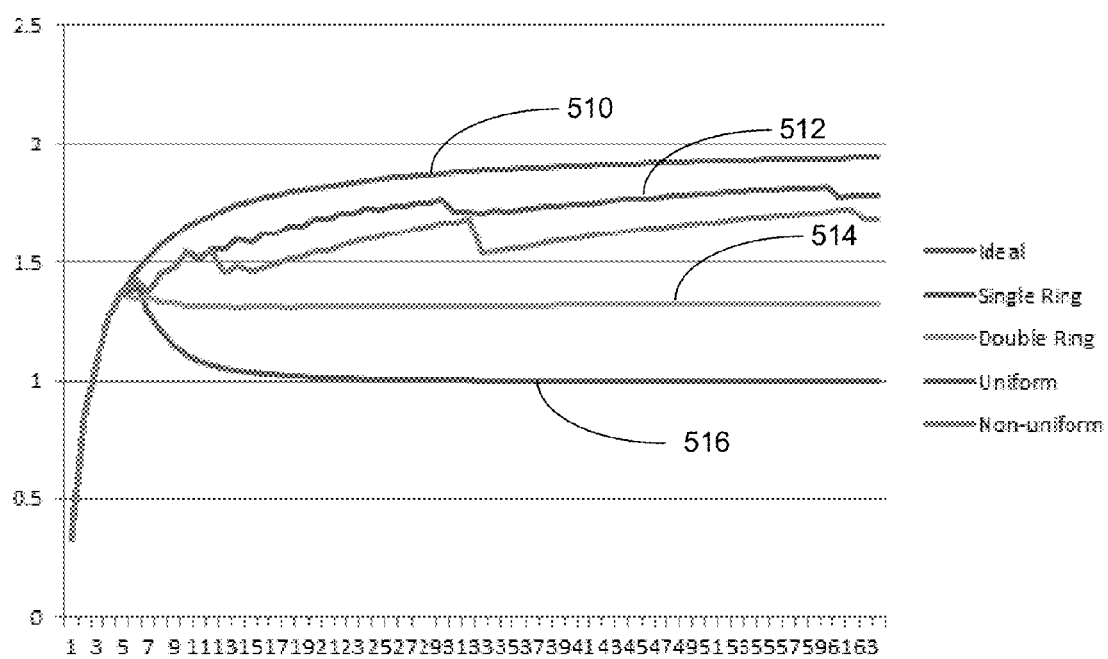
FIG. 15 is a diagram illustrating another comparison between an example algorithm in accordance with one or more examples described in this disclosure to other possible walking schemes.

FIG. 15 is a diagram illustrating another comparison between an example algorithm in accordance with one or more examples described in this disclosure to other possible walking schemes. The diagram provides an illustration of triangle domain results for the ideal reuse case 510, a uniform case 512, a double ring case 514 and a single ring case 516. Similar to FIG. 14, as illustrated in FIG. 15, the vertical axis is the ratio of number of primitives divided by number of vertex misses. The horizontal axis is tessellation level.

Figure 16:
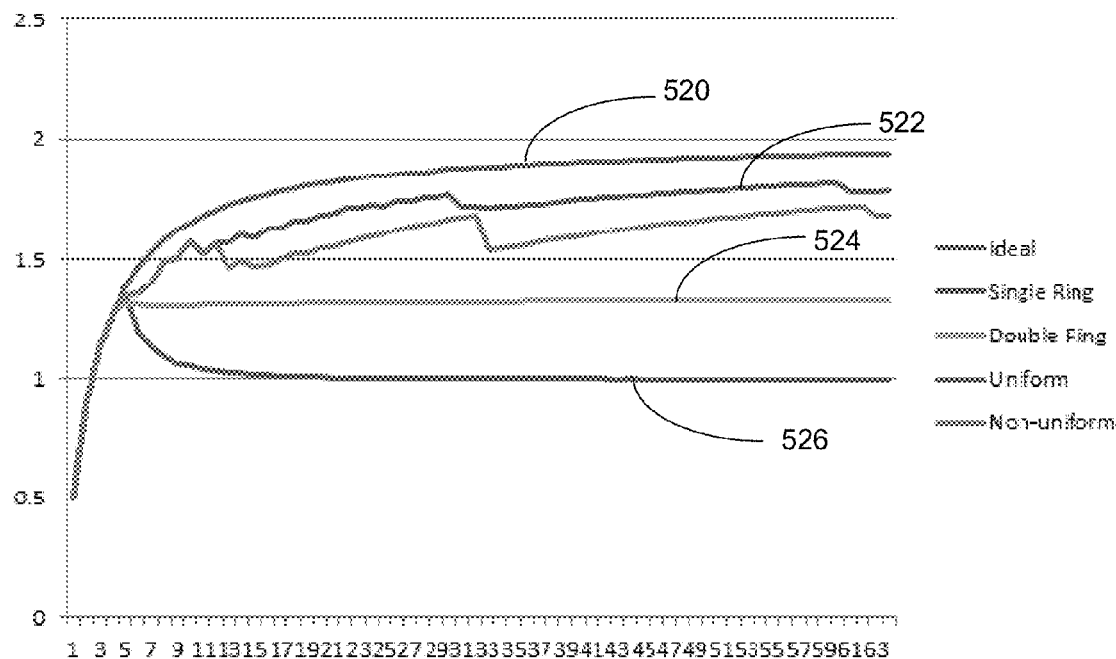
FIG. 16 is a diagram illustrating another comparison between an example algorithm in accordance with one or more examples described in this disclosure to other possible walking schemes.

FIG. 16 is a diagram illustrating another comparison between an example algorithm in accordance with one or more examples described in this disclosure to other possible walking schemes. The diagram provides an illustration of quad domain results for the ideal reuse case 520, a uniform case 522, a double ring case 524 and a single ring case 526. Similar to FIGS. 14-15, as illustrated in FIG. 16, the vertical axis is the ratio of number of primitives divided by number of vertex misses. The horizontal axis is tessellation level.

Figure 17:
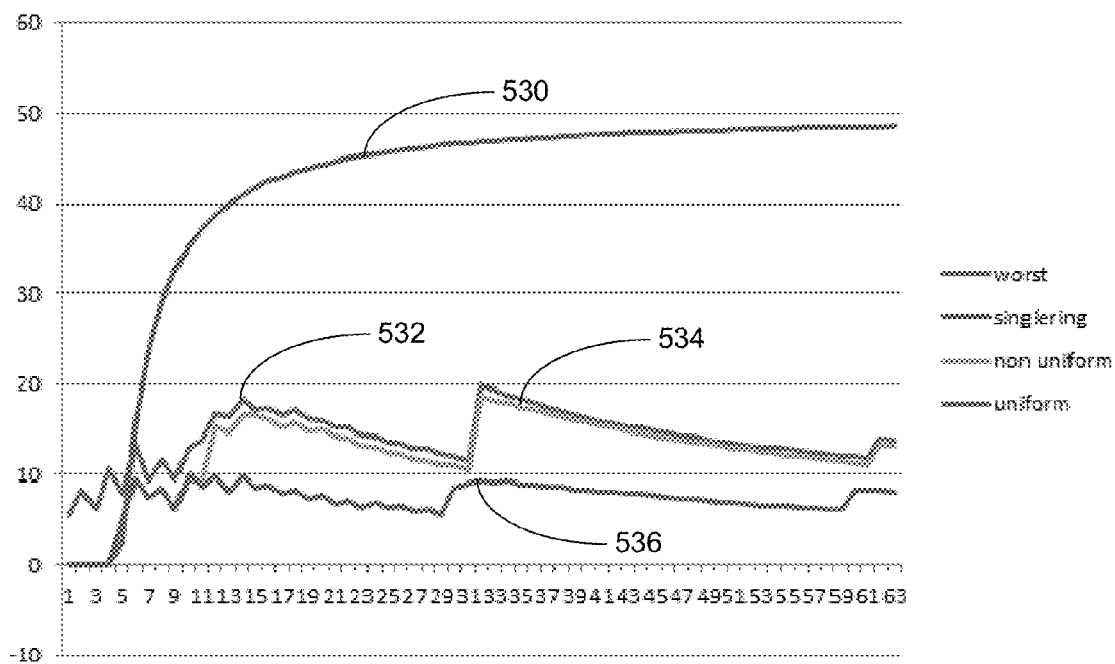
FIG. 17 is a diagram illustrating another comparison between an example algorithm in accordance with one or more examples described in this disclosure to other possible walking schemes.

FIG. 17 is a diagram illustrating another comparison between an example algorithm in accordance with one or more examples described in this disclosure to other possible walking schemes. The diagram provides an illustration of triangle domain performance loss vs ideal. FIG. 17 illustrates the performance loss (vs. ideal) for single ring 530, non-uniform 534 and uniform 536 walking schemes. Additionally, for interior tessellation levels 2 . . . 64, FIG. 17 illustrates the worst 532 possible outer tessellation level results. As illustrated in FIG. 17, the vertical axis indicates performance loss. The horizontal axis is tessellation level.

Figure 18:
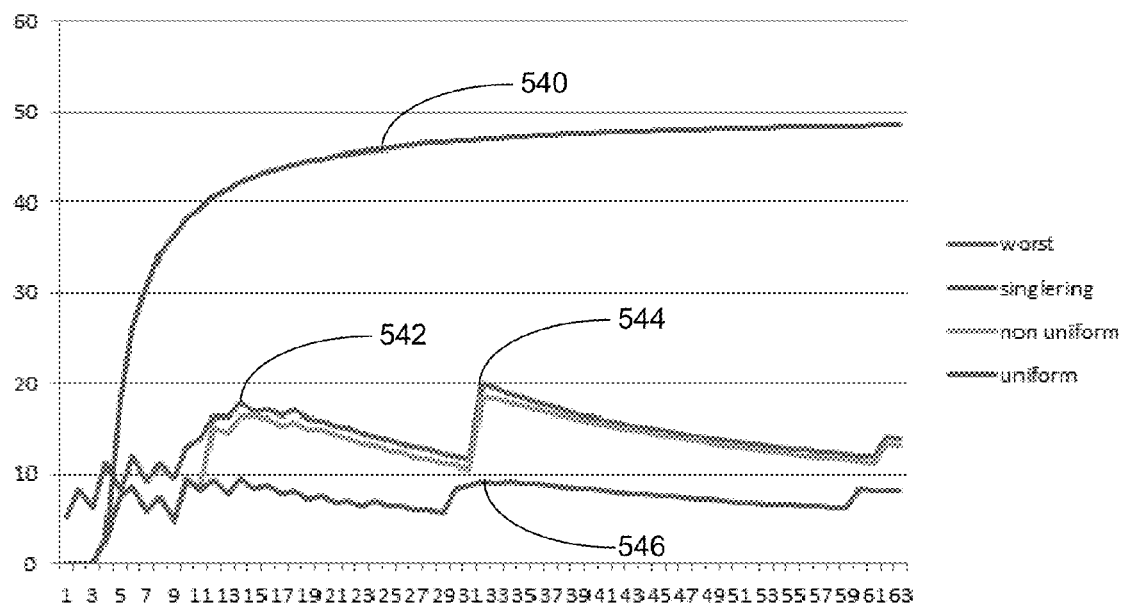
FIG. 18 is a diagram illustrating another comparison between an example algorithm in accordance with one or more examples described in this disclosure to other possible walking schemes.

FIG. 18 is a diagram illustrating another comparison between an example algorithm in accordance with one or more examples described in this disclosure to other possible walking schemes. The diagram provides an illustration of quad domain performance loss verses ideal. FIG. 18 illustrates the performance loss (vs. ideal) for single ring 540, non-uniform 544 and uniform 546 walking schemes. Additionally, for interior tessellation levels 2 . . . 64, FIG. 18 illustrates the worst 542 possible outer tessellation level results. As illustrated in FIG. 18, the vertical axis indicates performance loss. The horizontal axis is tessellation level.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A tessellation unit for tessellating a domain, the tessellation unit comprising circuitry, wherein the tessellation unit is configured to:
    divide the domain into a plurality of portions, including a first portion;
    divide at least the first portion into a plurality of sub-portions based on a number of shapes in the first portion and a size of a reuse buffer, such that storage of coordinates for a plurality of shapes within a first sub-portion of the sub-portions does not overflow the reuse buffer;
    determine coordinates for vertices for a first set of shapes that reside within the first sub-portion, wherein each shape of the first set of shapes includes at least one vertex on a first edge of the first portion, wherein at least one shape of the first set of shapes includes at least one vertex on a boundary of the domain, and wherein the first edge of the first portion is not one of the boundaries of the domain; and
    after determining coordinates for the vertices for the first set of shapes, determine coordinates for vertices for a second set of shapes that reside within the first sub-portion,
    wherein a shape in the first set of shapes for which the tessellation unit determines coordinates last shares no vertex with a shape in the second set of shapes for which the tessellation unit determines coordinates first,
    wherein each shape of the second set of shapes shares at least one vertex with at least one shape of the first set of shapes, and at least one shape of the second set of shapes includes at least one vertex on the same boundary of the domain as the at least one shape of the first set of shapes, and
    wherein none of the shapes of the second set of shapes includes a vertex on the first edge of the first portion;
    after determining coordinates for vertices for shapes in the first sub-portion, determine coordinates for vertices for a first set of shapes of a second sub-portion of the first portion wherein each shape of the first set of shapes of the second sub-portion includes at least one vertex on a first edge of the second sub-portion;
    after determining coordinates for the vertices for the first set of shapes of the second sub-portion, determine coordinates for vertices for a second set of shapes of the second sub-portion,
    wherein none of the shapes of the second set of shapes of the second sub-portion includes a vertex on the first edge of the second sub-portion; and
    output the determined coordinates for the first set of shapes of the first sub-portion, the determined coordinates for the second set of shapes of the first sub-portion, the determined coordinates for first set of shapes of the second sub-portion, and the determined coordinates for second set of shapes of the second sub-portion for graphics processing.

2. The tessellation unit of claim 1, where the domain is a triangular domain and wherein the domain is divided into three portions.

3. The tessellation unit of claim 1, wherein the domain is a quad domain and wherein the domain is divided into four portions.

4. The tessellation unit of claim 1, wherein the first edge of the first portion resides between two boundaries of the domain, wherein one of the two boundaries includes the boundary for the at least one shape of the first set of shapes of the first sub-portion that includes the at least one vertex on the boundary of the domain.

5. The tessellation unit of claim 1, wherein the first portion comprises at least four edges and wherein a first edge and a second edge of the at least four edges reside within boundaries of the domain and wherein a third edge and a fourth edge of the four edges each reside on boundaries of the domain.

6. The tessellation unit of claim 1, wherein, when the domain includes a side having an odd side length, the domain is split offset from a central axis of the side.

7. The tessellation unit of claim 1, wherein to divide the domain, the tessellation unit is configured to divide the domain into at least one portion having a non-uniform tessellation factor relative to the first portion, and wherein the tessellation unit is further configured to determine coordinates for a vertex that reside within the portion having the non-uniform tessellation factor separately from determining coordinates for a vertex in the first portion.

8. The tessellation unit of claim 7, wherein the at least one portion having a non-uniform tessellation factor relative to the first portion resides along a boundary of the domain.

9. A method of tessellating a domain comprising:
dividing, with a graphics processing unit (GPU), the domain into a plurality of portions, including a first portion;
dividing, with the GPU, at least the first portion into a plurality of sub-portions based on a number of shapes in the first portion and a size of a reuse buffer, such that storage of coordinates for a plurality of shapes within a first sub-portion of the sub-portions does not overflow the reuse buffer;
determining, with the GPU, coordinates for vertices for a first set of shapes that reside within the first sub-portion, wherein each shape of the first set of shapes includes at least one vertex on a first edge of the first portion, wherein at least one shape of the first set of shapes includes at least one vertex on a boundary of the domain, and wherein the first edge of the first portion is not one of the boundaries of the domain;
after determining coordinates for the vertices for the first set of shapes, determining, with the GPU, coordinates for vertices for a second set of shapes that reside within the first sub-portion,
wherein a shape in the first set of shapes for which the coordinates are determined last shares no vertex with a shape in the second set of shapes for which the coordinates are determined first,
wherein each shape of the second set of shapes shares at least one vertex with at least one shape of the first set of shapes, and at least one shape of the second set of shapes includes at least one vertex on the same boundary of the domain as the at least one shape of the first set of shapes, and
wherein none of the shapes of the second set of shapes includes a vertex on the first edge of the first portion;
after determining coordinates for vertices for shapes in the first sub-portion, determining, with the GPU, coordinates for vertices for a first set of shapes of a second sub-portion of the first portion, wherein each shape of the first set of shapes of the second sub-portion includes at least one vertex on a first edge of the second sub-portion;
after determining coordinates for the vertices for the first set of shapes of the second sub-portion, determining, with the GPU, coordinates for vertices for a second set of shapes of the second sub-portion,
wherein none of the shapes of the second set of shapes of the second sub-portion includes a vertex on the first edge of the second sub-portion;
adding, with the GPU, primitives to a patch based on the determined coordinates for vertices for the first set of shapes of the first sub-portion, and the determined coordinates for vertices for the second set of the first sub-portion, the determined coordinates for vertices for the first set of shapes of the second sub-portion, and the determined coordinates for vertices for the second set of shapes of the second sub-portion;
performing, with the GPU, graphics processing on the primitives of the patch to generate pixel values for pixels to be displayed; and
outputting, with the GPU, the pixel values.

10. The method of claim 9, where the domain is a triangular domain and wherein the domain is divided into three portions.

11. The method of claim 9, wherein the domain is a quad domain and wherein the domain is divided into four portions.

12. The method of claim 9, wherein the first edge of the first portion resides between two boundaries of the domain, wherein one of the two boundaries includes the boundary for the at least one shape of the first set of shapes of the first sub-portion that includes the at least one vertex on the boundary of the domain.

13. The method of claim 9, wherein the first portion comprises at least four edges and wherein a first edge and a second edge of the at least four edges reside within boundaries of the domain and wherein a third edge and a fourth edge of the four edges each reside on boundaries of the domain.

14. The method of claim 9, wherein, when the domain includes a side having an odd side length, the domain is split offset from a central axis of the side.

15. The method of claim 9, wherein dividing the domain into a plurality of portions, further comprises dividing the domain into at least one portion having a non-uniform tessellation factor relative to the first portion and determining coordinates for a vertex that reside within the portion having the non-uniform tessellation factor separately from determining coordinates for a vertex in the first portion.

16. The method of claim 15, wherein the at least one portion having a non-uniform tessellation factor relative to the first portion resides along a boundary of the domain.

17. A graphics processing unit (GPU) comprising:
circuitry comprising a tessellation unit for tessellating a domain, the tessellation unit comprising:
means for dividing the domain into a plurality of portions, including a first portion;
means for dividing at least the first portion into a plurality of sub-portions based on a number of shapes in the first portion and a size of a reuse buffer, such that storage of coordinates for a plurality of shapes within a first sub-portion of the sub-portions does not overflow the reuse buffer;
means for determining coordinates for vertices for a first set of shapes that reside within the first sub-portion, wherein each shape of the first set of shapes includes at least one vertex on a first edge of the first portion, wherein at least one shape of the first set of shapes includes at least one vertex on a boundary of the domain, and wherein the first edge of the first portion is not one of the boundaries of the domain; and
means for determining coordinates for vertices for a second set of shapes that reside within the first sub-portion after determining coordinates for the vertices for the first set of shapes,
wherein a shape in the first set of shapes for which the coordinates are determined last shares no vertex with a shape in the second set of shapes for which the coordinates are determined first,
wherein each shape of the second set of shapes shares at least one vertex with at least one shape of the first set of shapes, and at least one shape of the second set of shapes includes at least one vertex on the same boundary of the domain as the at least one shape of the first set of shapes, and wherein none of the shapes of the second set of shapes includes a vertex on the first edge of the first portion;

means for determining coordinates for vertices for a first set of shapes of a second sub-portion of the first portion, wherein each shape of the first set of shapes of the second sub-portion includes at least one vertex on a first edge of the second sub-portion after determining coordinates for vertices for shapes in the first sub-portion;

means for determining coordinates for vertices for a second set of shapes of the second sub-portion after determining coordinates for the vertices for the first set of shapes of the second sub-portion, wherein none of the shapes of the second set of shapes of the second sub-portion includes a vertex on the first edge of the second sub-portion; and means for outputting the determined coordinates for the first set of shapes of the first sub-portion, the determined coordinates for the second set of shapes of the determined coordinates for the first sub-portion, the first set of shapes of the second sub-portion, and the determined coordinates for the second set of shapes of the second sub-portion for graphics processing.

18. The GPU of claim 17, where the domain is a triangular domain and wherein the domain is divided into three portions.

19. The GPU of claim 17, wherein the domain is a quad domain and wherein the domain is divided into four portions.

20. The GPU of claim 17, wherein the first edge of the first portion resides between two boundaries of the domain, wherein one of the two boundaries includes the boundary for the at least one shape of the first set of shapes of the first sub-portion that includes the at least one vertex on the boundary of the domain.

21. The GPU of claim 17, wherein the first portion comprises at least four edges and wherein a first edge and a second edge of the at least four edges reside within boundaries of the domain and wherein a third edge and a fourth edge of the four edges each reside on boundaries of the domain.

22. The GPU of claim 17, wherein, when the domain includes a side having an odd side length, the domain is split offset from a central axis of the side.

23. The GPU of claim 17, wherein dividing the domain into a plurality of portions, further comprises dividing the domain into at least one portion having a non-uniform tessellation factor relative to the first portion and wherein the tessellation unit is further configured to determine coordinates for a vertex that reside within the portion having the non-uniform tessellation factor separately from determining coordinates for a vertex in the first portion.

24. The GPU of claim 23, wherein the at least one portion having a non-uniform tessellation factor relative to the first portion resides along a boundary of the domain.

25. A non-transitory computer-readable medium, that is not a signal, comprising instructions that when executed cause a programmable processor to:

divide a domain into a plurality of portions, including a first portion;

divide at least the first portion into a plurality of sub-portions based on a number of shapes in the first portion and a size of a reuse buffer, such that storage of coordinates for a plurality of shapes within a first sub-portion of the sub-portions does not overflow the reuse buffer;

determine coordinates for vertices for a first set of shapes that reside within the first sub-portion, wherein each shape of the first set of shapes includes at least one vertex on a first edge of the first portion, wherein at least one shape of the first set of shapes includes at least one vertex on a boundary of the domain, and wherein the first edge of the first portion is not one of the boundaries of the domain; and after determining coordinates for the vertices for the first set of shapes, determine coordinates for vertices for a second set of shapes that reside within the first sub-portion, wherein a shape in the first set of shapes for which the coordinates are determined last shares no vertex with a shape in the second set of shapes for which the coordinates are determined first, wherein each shape of the second set of shapes shares at least one vertex with at least one shape of the first set of shapes, and at least one shape of the second set of shapes includes at least one vertex on the same boundary of the domain as the at least one shape of the first set of shapes, and wherein none of the shapes of the second set of shapes includes a vertex on the first edge of the first portion;

after determining coordinates for vertices for shapes in the first sub-portion, determine coordinates for vertices for a first set of shapes of a second sub-portion of the first portion wherein each shape of the first set of shapes of the second sub-portion includes at least one vertex on a first edge of the second sub-portion;

after determining coordinates for the vertices for the first set of shapes of the second sub-portion, determine coordinates for vertices for a second set of shapes of the second sub-portion, wherein none of the shapes of the second set of shapes of the second sub-portion includes a vertex on the first edge of the second sub-portion; and output the determined coordinates for the first set of shapes of the first sub-portion, the determined coordinates for the second set of shapes of the first sub-portion, the determined coordinates for the first set of shapes of the second sub-portion, and the determined coordinates for the second set of shapes of the second sub-portion for graphics processing.

26. The computer-readable medium of claim 25, where the domain is a triangular domain and wherein the domain is divided into three portions.

27. The computer-readable medium of claim 25, where the domain is a quad domain and wherein the domain is divided into four portions.

28. The computer-readable medium of claim 25, where the first edge of the first portion resides between two boundaries of the domain, wherein one of the two boundaries includes the boundary for the at least one shape of the first set of shapes of the first sub-portion that includes the at least one vertex on the boundary of the domain.

29. The computer-readable medium of claim 25, where the first portion comprises at least four edges and wherein a first edge and a second edge of the at least four edges reside within boundaries of the domain and wherein a third edge and a fourth edge of the four edges each reside on boundaries of the domain.

30. The computer-readable medium of claim 25, where when the domain includes a side having an odd side length, the domain is split offset from a central axis of the side.

31. The computer-readable medium of claim 25, wherein the instructions causing the processor to divide the domain into a plurality of portions further comprise instructions causing the processor to divide the domain into at least one portion having a non-uniform tessellation factor relative to the first portion and to determine coordinates for a vertex that reside within the portion having the non-uniform tessellation factor separately from determining coordinates for a vertex in the first portion.

32. The computer-readable medium of claim 31, where the at least one portion having a non-uniform tessellation factor relative to the first portion resides along a boundary of the domain.

33. A device comprising:
a central processing unit (CPU); and
a graphics processing unit (GPU) configured to receive information indicating a domain, the GPU comprising:
  a tessellation unit for tessellating the domain, the tessellation unit configured to:
    divide the domain into a plurality of portions, including a first portion;
    divide at least the first portion into a plurality of sub-portions based on a number of shapes in the first portion and a size of a reuse buffer, such that storage of coordinates for a plurality of shapes within a first sub-portion of the sub-portions does not overflow the reuse buffer;
    determine coordinates for vertices for a first set of shapes that reside within the first sub-portion, wherein each shape of the first set of shapes includes at least one vertex on a first edge of the first portion, wherein at least one shape of the first set of shapes includes at least one vertex on a boundary of the domain, and wherein the first edge of the first portion is not one of the boundaries of the domain;
    after determining coordinates for the vertices for the first set of shapes, determine coordinates for vertices for a second set of shapes that reside within the first sub-portion,
    wherein a shape in the first set of shapes for which the tessellation unit determines coordinates last shares no vertex with a shape in the second set of shapes for which the tessellation unit determines coordinates first,
    wherein each shape of the second set of shapes shares at least one vertex with at least one shape of the first set of shapes, and at least one shape of the second set of shapes includes at least one vertex on the same boundary of the domain as the at least one shape of the first set of shapes, and
    wherein none of the shapes of the second set of shapes includes a vertex on the first edge of the first portion;
    after determining coordinates for vertices for shapes in the first sub-portion, determine coordinates for vertices for a first set of shapes of a second sub-portion of the first portion, wherein each shape of the first set of shapes of the second sub-portion includes at least one vertex on a first edge of the second sub-portion;
    after determining coordinates for the vertices for the first set of shapes of the second sub-portion, determine coordinates for vertices for a second set of shapes of the second sub-portion,
    wherein none of the shapes of the second set of shapes of the second sub-portion includes a vertex on the first edge of the second sub-portion; and
    output the determined coordinates for the first set of shapes of the first sub-portion, the determined coordinates for the second set of shapes of the first sub-portion, the determined coordinates for the first set of shapes of the second sub-portion, and the determined coordinates for the second set of shapes of the second sub-portion for graphics processing.

34. The device of claim 33, where the domain is a triangular domain and wherein the domain is divided into three portions.

35. The device of claim 33, wherein the domain is a quad domain and wherein the domain is divided into four portions.

36. The device of claim 33, wherein the first edge of the first portion resides between two boundaries of the domain, wherein one of the two boundaries includes the boundary for the at least one shape of the first set of shapes of the first sub-portion that includes the at least one vertex on the boundary of the domain.

37. The device of claim 33, wherein the first portion comprises at least four edges and wherein a first edge and a second edge of the at least four edges reside within boundaries of the domain and wherein a third edge and a fourth edge of the four edges each reside on boundaries of the domain.

38. The device of claim 33, wherein, when the domain includes a side having an odd side length, the domain is split offset from a central axis of the side.

39. The device of claim 33, wherein to divide the domain, the tessellation unit is configured to divide the domain into at least one portion having a non-uniform tessellation factor relative to the first portion and wherein the tessellation unit is further configured to determine coordinates for a vertex that reside within the portion having the non-uniform tessellation factor separately from determining coordinates for a vertex in the first portion.

40. The device of claim 39, wherein the at least one portion having a non-uniform tessellation factor relative to the first portion resides along a boundary of the domain.

41. The device of claim 33, further comprising:
a domain shader coupled to the tessellation unit and configured to convert coordinates for the vertices of a shape in the domain into coordinates for vertices of a patch;
a vertex reuse buffer coupled to the domain shader and configured to store the coordinates for the vertices of the patch from the domain shader;
a controller within the reuse buffer, the controller including reuse control logic configured to determine when the vertex reuse buffer is storing coordinates for vertices needed by the tessellation unit; and
wherein the tessellation unit is further configured to invoke the domain shader when the controller indicates that the vertex reuse buffer is not storing coordinates for vertices needed by the tessellation unit and to read the coordinates from the vertex reuse buffer when the controller indicates that the vertex reuse buffer is storing coordinates for vertices needed by the tessellation unit.

* * * * *